United States Patent [19]
Nakabayashi et al.

[11] 3,993,787
[45] Nov. 23, 1976

[54] ROTARY MOLDER

[75] Inventors: Hirotomo Nakabayashi, Yokohama; Kikuo Ohura; Nobuhito Fujita, both of Fujisawa; Shintaro Miyakawa, Yamato; Tukasa Saito, Fujisawa; Makoto Higuchi, Kawasaki, all of Japan

[73] Assignee: Nippon Oil Seal Industry Co., Ltd., Tokyo, Japan

[22] Filed: Nov. 7, 1975

[21] Appl. No.: 630,013

[30] Foreign Application Priority Data
Nov. 14, 1974 Japan.................................. 49-13130

[52] U.S. Cl................................. 425/125; 425/127; 425/246; 425/247; 425/348 S; 425/444; 425/DIG. 47
[51] Int. Cl.².......................................... B29H 9/10
[58] Field of Search................ 425/125, 127, 129 R, 425/246, 247, 346, 347, 348, 349, 350, 351, 444, DIG. 47

[56] References Cited
UNITED STATES PATENTS

| | | | |
|---|---|---|---|
| 3,337,920 | 8/1967 | Jagger et al.................. | 425/DIG. 47 |
| 3,621,533 | 11/1971 | Bertrandi..................... | 425/DIG. 47 |
| 3,754,846 | 8/1973 | Choate......................... | 425/DIG. 47 |
| 3,841,809 | 10/1974 | Tucker......................... | 425/DIG. 47 |
| 3,936,257 | 2/1976 | Christiansen ................ | 425/DIG. 47 |

FOREIGN PATENTS OR APPLICATIONS

| | | | |
|---|---|---|---|
| 984,032 | 2/1965 | United Kingdom.......... | 425/DIG. 47 |

*Primary Examiner*—J. Howard Flint, Jr.
*Attorney, Agent, or Firm*—Holman & Stern

[57] ABSTRACT

A molding machine for producing products of a rubber-like resilient material, particularly oil seals in which a first mold part is stationarily supported in axial spaced relation to a main base, a base between the main base and first mold part is axially movable toward and away from the first mold part and supports a second complementary mold part, a holder between and axially spaced from the first and second mold parts is mounted for limited axial movement and rotary movement in a plane parallel to the first and second mold parts, with the holder carrying two diametrically opposite further mold parts spaced apart an equal distance from the axis of the rotary movement and one of the further mold parts being in substantially registry with the first and second mold parts so that movement of the base relative to the holder brings the second mold part into operative relation to the one further mold part and continued movement of the movable base moves the holder toward the first mold part until the first mold part, one further mold part and second mold part are assembled to provide a molding space therein for receiving the molding material. Means are provided for introducing a reinforcing ring into the other further mold part of the holder prior to its movement to the position occupied by the one further mold part during molding and to remove the completed article from the one further mold part when it occupies the position of the other further mold part during molding. In addition, means are provided for removing the molding flash after the mold opening and for transporting the flash to discharge means. Also, means are employed to retain the two further mold parts at diametrically opposite points in the holder as well as prevent rotation and tilting of such mold parts relative to the holder.

29 Claims, 30 Drawing Figures

ROTARY MOLDER

BACKGROUND OF THE INVENTION

The present invention relates to rotary molding machines of the type provided with a rotary arrangement of a plurality of similar mold parts adapted to be successively moved into operative relationship with a complementary mold part to define a sealed split mold for molding purposes and, more particularly, to a machine suitable for molding sealing members such as oil seals.

PRIOR ART

Heretofore, molding machines for making oil seals, O-rings, and other moldings of rubber-like resilient materials have used a planar arrangement of a plurality of mold sets for simultaneous molding in order to provide for an increased output. In such simultaneous molding, however, it is inevitable that the molding conditions such as temperature and pressure vary among the individual mold sets, and the performance of the simultaneous products is apt to vary or fluctuate. While it is desired to use a single mold set for successive molding for the purpose of eliminating the fluctuations of the molding conditions among the individual products, in such situation, production output is reduced.

OBJECTS AND SUMMARY OF THE INVENTION

The present invention provides a molding machine for overcoming the above-mentioned drawbacks existing in the prior art. The invention aims to preclude fluctuations or variations of the molding conditions for individual moldings by employing a single assortment of mold parts constituting a mold set except for one mold part while employing an arrangement of a plurality of similar mold parts as the remaining mold part. At the same time, reduction of the molding cycle is intended by a set up which effects requisite steps other than the molding step, for example, a step for inserting a product take-out metal reinforcing ring, continuously with the molding step.

Another object of the invention is to maintain molding precision for an extended period of time and permit accurate intermold adjustments for assuring a steady quality of the molded products by means preventing an excessive stress from being developed in the molding machine body in such a situation as when an abnormal stress is set up in the cyclic mold at the time of closing the mold parts, or at the time of molding pressure application due to such causes as incorrect insertion of the reinforcing metal ring in the mold part, or the intrusion of foreign matter from the outside. This is accomplished by supporting the cyclic mold part with a plurality of pins to permit a slight axial displacement of the mold part relative to the mold holder and also a slight radial deviation of the mold part and thus allow the mold part to be separated from the mold holder when an abnormal stress develops.

An additional object of the present invention is to solve effectively the problem of departure of the cyclic mold from registry with the rest of the mold set accompanying the rotary mechanism, namely to correct an out of register of each of a plurality of cyclic molds which are successively moved into registry with the remaining part of the mold set, by means of engagement between pins and respective guide bushings.

Yet a further object of the invention is to permit readily the securement and positioning of each cyclic mold part by means of a simple construction.

Another object of the invention is to permit the removal of the molded product and the insertion of the reinforcing metal ring into the cyclic mold part to be entirely automatically effected.

While the molding space is generally evacuated through an intermold gap to prevent the intrusion of gas into the molded product, the position of the intermold gap varies with molds of different configurations and different dimensions. Hence, it has been necessary to provide a plurality of evacuating passages suited to the respective intermold gaps in different molds.

According to the present invention, a single radially elongated evacuating passage is made to be compatible with different molds.

Further objects and advantages of the present invention will become more readily apparent to persons skilled in the art from the ensuing detailed description and annexed drawings, and in which drawings:

DETAILED DESCRIPTION OF THE EMBODIMENTS

Firstly, the invention will be described in connection with a three-part mold.

General Description

Figure 1:
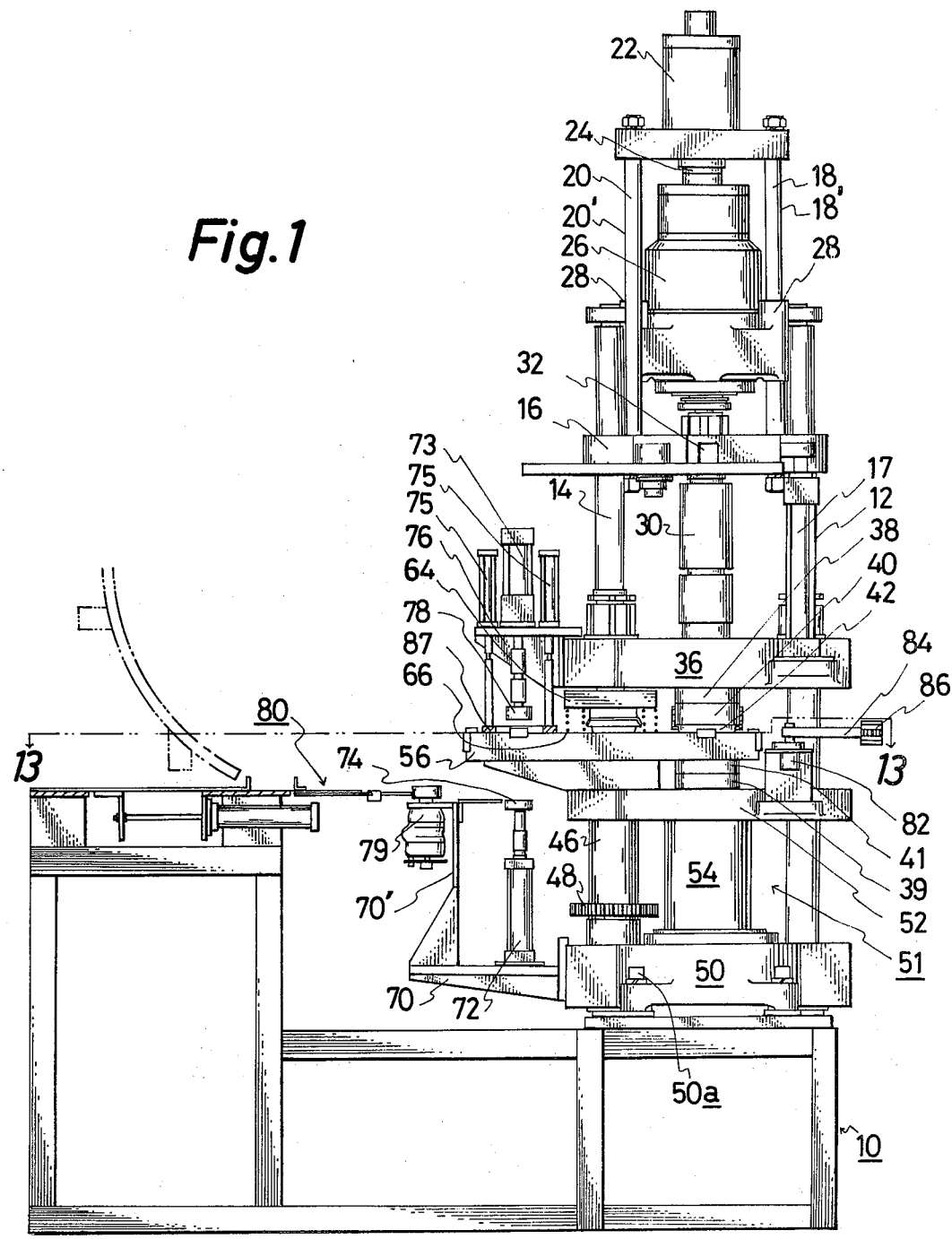
FIG. 1 is a view in elevation of a rotary molding machine employing a three-part mold in accordance with the invention.
Figure 2:
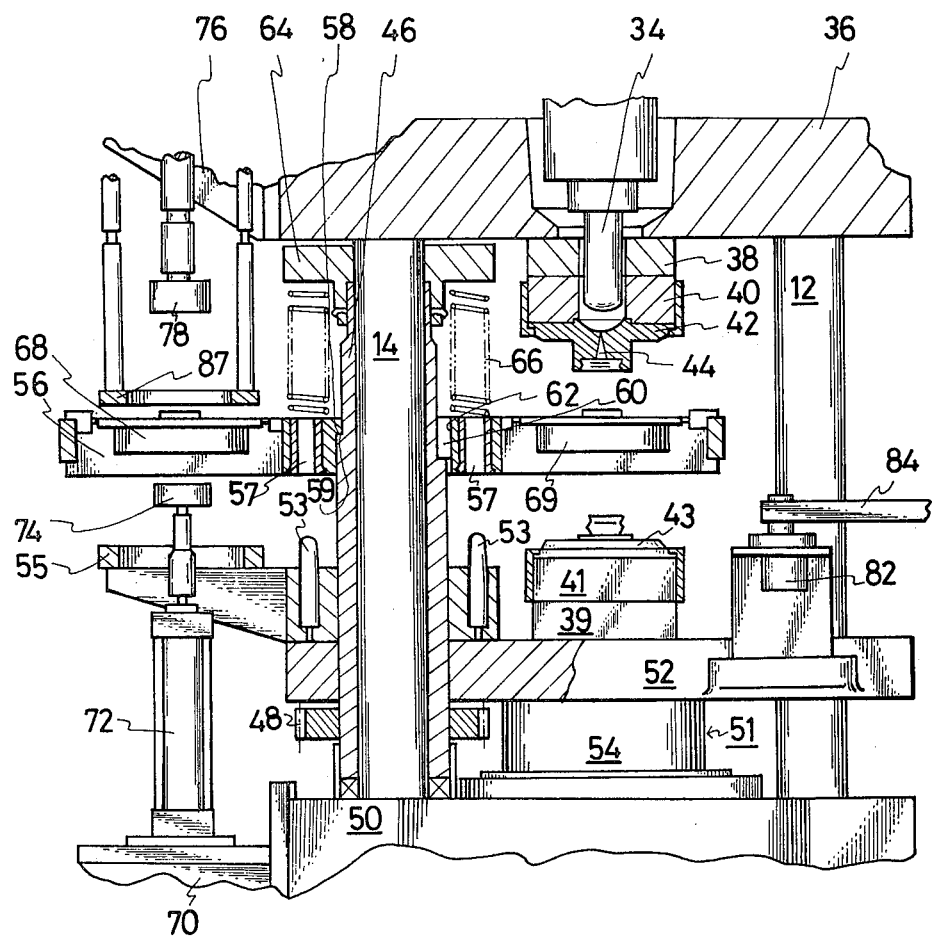
FIG. 2 is a fragmentary elevational view, partly in cross-section of part of the machine illustrated in FIG. 1, FIGS. 3–8 are views similar to FIG. 2 illustrating the arrangement of the components during operation.

As shown in FIGS. 1 and 2, the present molding machine includes a main base 10 and two parallel pillars or columns 12 and 14 extending from and normal to the base, with the pillars being at a predetermined spacing from each other. The pillars extend through an injection cylinder holder 16 with the holder 16 supporting four injection cylinder supporting pillars or columns 18, 18', 20 and 20', extending normal to the holder 16 and parallel to the pillars 12 and 14.

In FIG. 1, the pillars 18' and 20' are located behind the pillars 18 and 20, respectively.

An injection cylinder unit 22 is secured to the free or upper ends of the pillars 18, 18', 20 and 20', and a piston rod 24 thereof projects downwardly from the lower end of the cylinder 22 and is coupled to an oil motor assembly 26. The motor assembly 26 is guided along the pillars 18, 18', 20 and 20' by guide bushings 28 and connected to the lower ends of the motor assembly 26 is a screw (not shown) which extends into a cylinder (not shown) secured together with a cylindrical heating jacket 30 to the holder 16. The holder 16 is also provided with a material supply port 32 for furnishing the molding material between the cylinder and screw (not illustrated).

As disclosed in FIG. 2, a nozzle 34 is provided at the tip of the cylinder (not shown) and extends through an upper stationary base 36 supported by the pillars 12 and 14, or by other support means, at a location below the holder 16. The nozzle 34 also passes through a refractory member 38 and an upper heating member 40 associated therewith, and the members 38 and 40 are secured to the under surface of the holder 16. The lower end of the nozzle 34 is adapted to engage a material ejection port 44 of an upper mold part 42 which is removably supported in contact with the lower surface of the heating member 40. The holder 16 is moved vertically by means of a cylinder assembly attached to the top of the stationary base 36.

A lower stationary base 50 is mounted by bolts or the like 50a to the top of the main base 10. A rotatable sleeve 46 surrounds one of the pillars and in FIG. 2, the pillar 14, with the sleeve being as such length as to extend between the stationary bases 36 and 50. The outer periphery of the sleeve 46 is provided with a gear 48 adjacent the lower end thereof, and the gear 48 meshes with a gear operably connected to a drive motor (not illustrated) for oscillatory movement.

A movable base 52 is located between and in substantial parallelism to the stationary bases 36 and 50 with the sleeve and pillar 12 extending through the base 52 which is slidably over the sleeve and pillar via a rod 54 of a pressure-applying unit 51 employing a booster type oil pressure cylinder coupled to its underside. A refractory member 39 and a lower heating member 41 are secured to the top or upper surface of the movable base 52. A lower mold part 43 is removably mounted in contact with the upper surface of the heating member 41.

An annular intermediate mold support base 55 is also carried by the movable base 52 and is positioned symmetrically with the lower mold part 43 with respect to the axis of the pillar 14. In addition, the movable base 52 is provided with two positioning pins 53 which are tapered, and which extend vertically from the top thereof.

A mold part holder 56 is positioned between the movable base 52 and the upper stationary base 36, with the rotatable sleeve 46 passing through the center of the holder 56 as shown in FIG. 2. The movement of the holder 56 in the direction of the movable base 52 is restricted by a shoulder or flange 58 on the inner periphery of the holder engaging a shoulder or flange 59 on the outer periphery of the sleeve 46. The sleeve 46 and holder 56 are connected for rotary movement in unison by means of a key 60 on the outer periphery of the sleeve adjacent the shoulder 59 and a key slot 62 in the inner periphery of the shoulder 56. The engagement of the key 60 in the slot 62 is adapted to be released when the holder 56 is raised a predetermined distance by the movable base 52 as will be later described.

The lowering of the holder 56 is achieved by the restoring action of helical springs 66 uniformly spaced about the sleeve 46 and biased between an annular flange 64 at the upper end of the sleeve adjacent the lower surface of the stationary base 36 and the holder 56. The holder 56 carries intermediate mold parts 68 and 69, with the mold parts being in the same configuration and arranged in the holder symmetrically with respect to the axis of the pillar 14. It will be noted that the holder 56 is provided with guide bushings 57 in which the pins 53 are adapated to be engaged for positioning the holder 56 relative to the movable base 52.

The lower stationary base 50 is provided with a horizontal bracket 70 located to the side of the pillar 14 and the bracket mounts a ring-inserting member 74 which is concentric with the mold part 68 and reciprocable in a direction parallel to the pillars 12 and 14 by a cylinder unit 72 supported on the top of the bracket 70. It also serves as a product receptacle for receiving a product from the first intermediate mold part 68.

The upper stationary base 36 is also provided with a horizontal bracket 76 which extends in the same direction as the bracket 70 and affixed to the top of the bracket 76 is a kick-off cylinder unit 73 by which a product kicking means 78 concentric with the mold part 68 is reciprocated in a direction parallel to the pillars 12 and 14.

As shown in FIG. 1, the bracket 70 has an upright extension 70' to which a ring supply drive motor 79 is secured. The drive motor 79 is equipped with a radially extending ring supply means 80 (FIG. 13) capable of arcuate movement. The movable base 52 also has a trimming arm drive motor 82 secured thereto and a trimming arm 84 is operably coupled to the drive shaft of the motor 82 while the tip of the trimming arm 84 is provided with fingers 86 for gripping a molding flash. An annular mold part retainer 87 is positioned slightly above the mold holder 56 and is constantly urged downwardly by means of two pneumatic cylinder units 75 secured to the bracket 76.

Mold Retaining Mechanism

Figure 11:
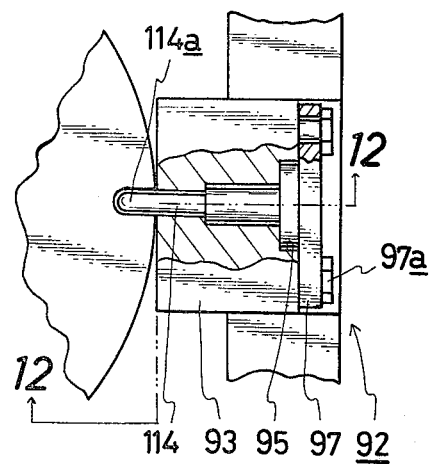
FIG. 11 is a fragmentary plan view, partly in section, illustrating a rotation preventing means.
Figure 12:
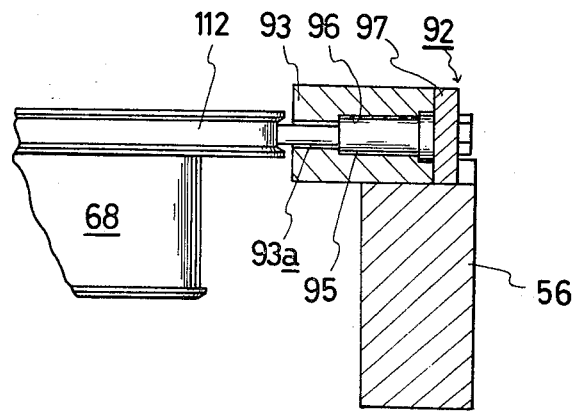
FIG. 12 is a view taken along the line 12—12 of FIG. 11, the view looking in the direction of the arrows.
Figure 13:
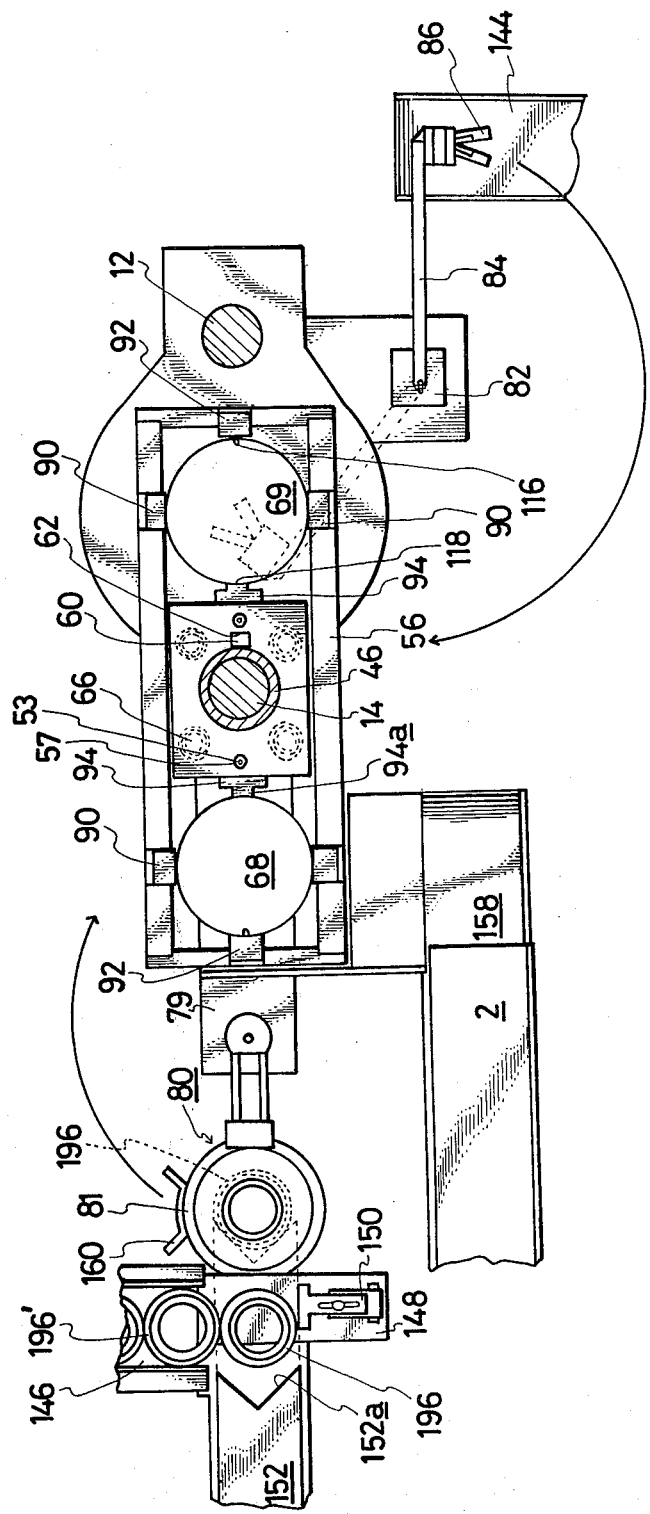
FIG. 13 is a view taken along the line 13—13 in FIG. 1, the view looking in the direction of the arrows.

Referring to FIGS. 9–14, each of the intermediate mold parts 68 and 69 is retained between two diametrically opposed retaining means 90 provided on top of the mold holder 56 as best shown in FIG. 13. A rotation preventing means 92 and a tilting preventing means 94 which face each other in contact with the periphery of each intermediate mold at positions in a line crossing the line extending between the two retaining means 90.

Figure 9:
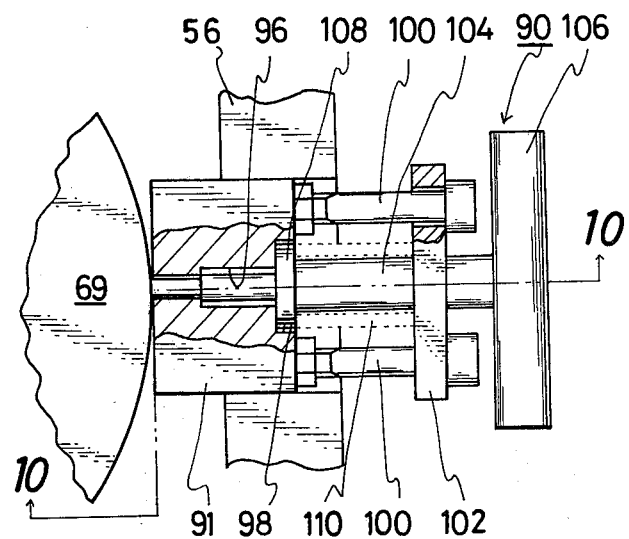
FIG. 9 is a fragmentary plan view, partly in cross-section illustrating a mold retaining means in accordance with the invention.
Figure 10:
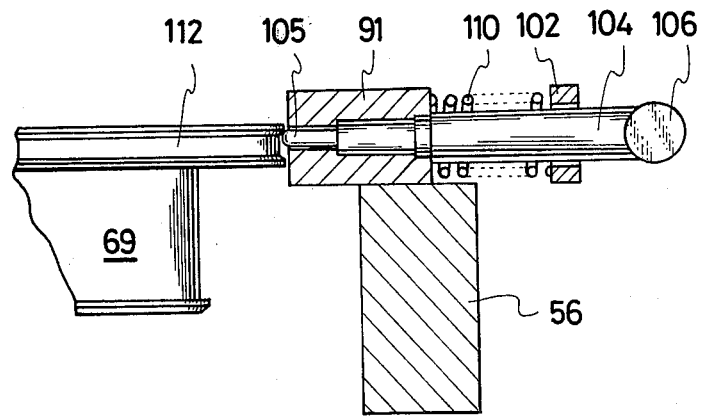
FIG. 10 is a view taken along the line 10—10 of FIG. 9, the view looking in the direction of the arrows.

As shown in FIG. 9, each retaining means 90 includes a base member 91 secured to the mold holder 56 and the base member is formed with an open bore 96 extending in the radial direction of the mold part 69. The bore 96 includes a rectangular stepped portion 98 open on its side opposite the mold part 69. A spring retainer member 102 is held at a predetermined distance from the side of the base member 91 opposite the mold part 69 and is secured to the base member 91 by two bolts 100. A retaining pin 104 having a spherical tip 105 extends through the spring retainer member 102 and the open bore 96 and, at its end remote from the mold part is provided with a grip member 106. At its intermediate portion, the pin 104 has a rectangular flange 108 which is positioned in the rectangular stepped bore portion 98 to restrict the projection of the pin 104 toward the mold part 69.

A helical spring 110 surrounds the pin 104 and is biased between the flange 108 and spring retainer member 102 to resiliently restrict the retraction of the spherical tip 105 of the pin 104 away from the mold part 69. The intermediate mold part 68 or 69 is provided in its upper portion on the outer periphery with an annular groove 112 of a width permitting a slight axial movement of the mold part relative to the retaining pin 104. The tip 105 of the pin 104 extends into the annular groove 112 and serves to prevent downward movement of the mold part.

The rotation preventing means 92 (FIGS. 11 and 12) includes a base member 93 secured to the mold holder 96, and the base member 93 is provided with an open bore 93a extending in the radial direction of the mold part and including a shoulder 95. A pin 114 extends through the bore 95a and its enlarged diameter portion 96 is adapted to engage with the shoulder 95 to restrict the projection of the pin 114 towards the mold part. The movement of the pin 114 away from the mold part is restricted by an abutment member 97 secured by bolts 97a to the base member 94. A tip portion 114a is received in a notch 116 provided in the outer periphery of the upper portion of the mold part, and the notch 116 is deeper than the annular groove 112 thereby preventing rotation of the mold part relative to the mold holder 56.

The tilting preventing means 94 is of substantial T-shape in cross-section, and leg 94a thereof is in contact with the outer periphery of the intermediate mold part.

Mounting Means for the Upper and Lower Molds

Figure 14:
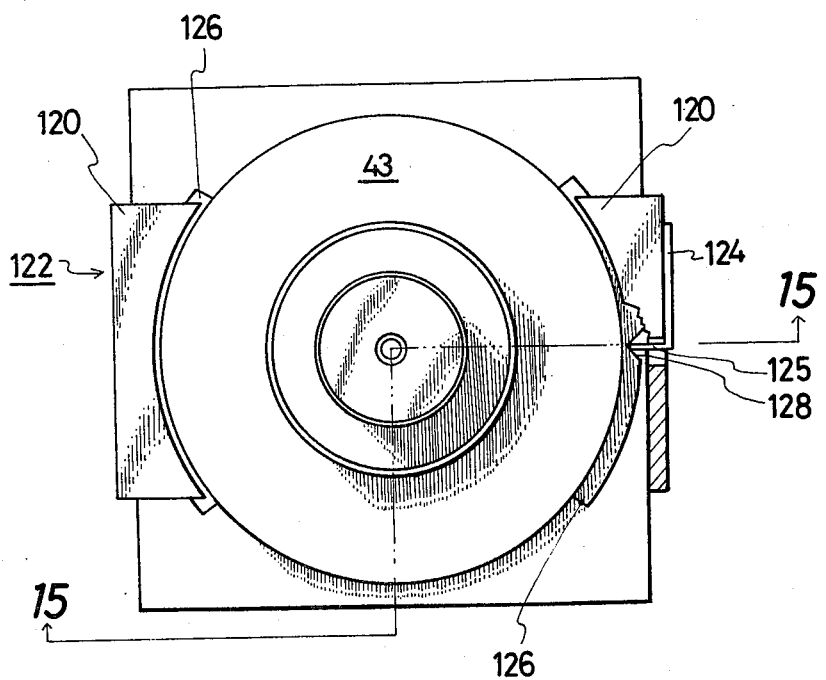
FIG. 14 is a plan view illustrating the construction of a mold mounting mechanism in accordance with the invention.
Figure 15:
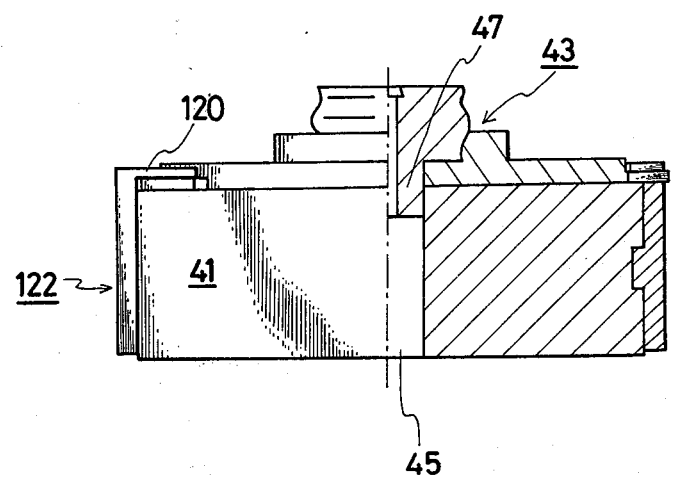
FIG. 15 is a view taken along the line 15—15 of FIG. 14, the view looking in the direction of the arrows.

As best disclosed in FIGS. 14 and 15, the lower heating member 41 is provided on its diametrically opposite sides with holding means 122 secured thereto. Each holding means 122 is provided with a flange portion 120 which extends over the top of the heating member 41 but is slightly spaced therefrom. A plate spring 124 is affixed to the outer side of each holder 122 and has a portion thereof extending through the holding means into the above-mentioned space.

The lower mold 43 on the outer periphery of its lower portion is provided with two integral sector-shaped flanges 126 which oppose each other. At least one of the flanges 126 is formed with a central notch 128. At the time of mounting the lower mold 43 on the heating base 41, the mold is positioned relative to the base with end portion 125 of each spring 124 engaged in the notch 128 of the corresponding flange 126. Also, a projection 47 extending from the bottom of the lower mold 43 is positioned in a central recess 45 provided in the heating member 41 to prevent radial deviation between the lower mold 43 and the heating member 41.

The upper mold 42 is also mounted under the upper heating member 40 in the same manner as the lower mold 43.

Trimming Mechanism

Figure 16:
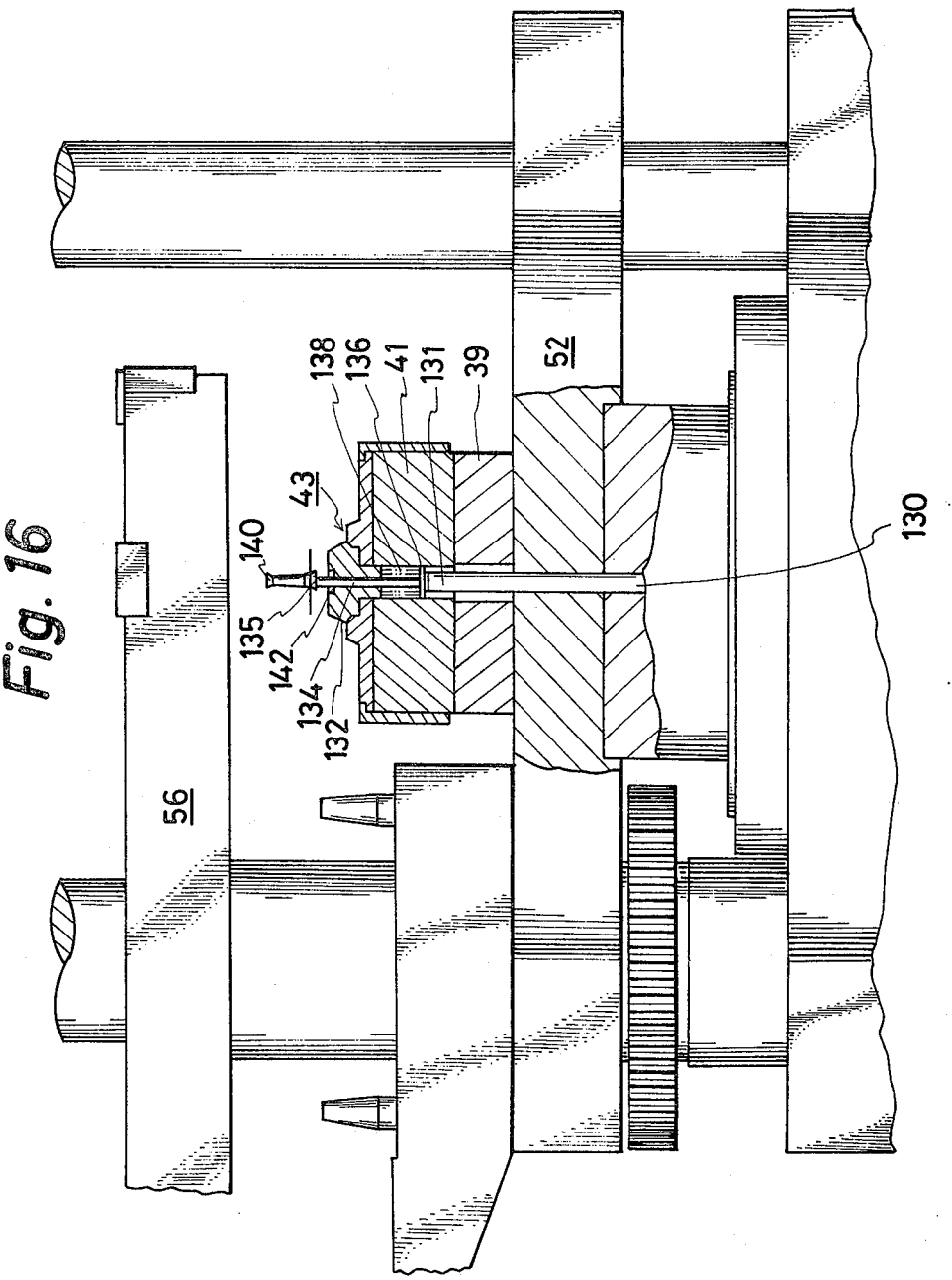
FIG. 16 is a fragmentary view in elevation and partly in cross-section illustrating a trimming mechanism according to the invention.

As illustrated in FIGS. 13 and 16, a molding flash ejector 130 extends through the movable base 52 and the refractory member 39, and upper end 131 thereof extends within the lower heating member 41. The upper end 131 is in contact with the lower end of an ejector pin 134 extending through a lower mold core 132. The pin 134 is provided at its lower end with a dish-like member 136 and a helical spring 138 coaxial with the pin 134 is biased between the lower mold core 132 and the dish-like member 136.

The lower mold core 132 is formed on its upper surface with an inwardly flaring frustoconical recess 142 to allow molding flash 140 to be left on the side of the lower mold 43. Also, the ejector pin 134 has a portion 135 of enlarged diameter at the upper end thereof.

When the molding flash ejector 130 is driven upwardly by a drive mechanism (not shown), the ejector pin 134 is moved upwardly by the ejector 130 against the action of the spring 138. At this time, the molding flash 140 having been retained in the recess 142 of the lower mold core 132 is ejected from the recess 142 by the tip of the pin 134. With a subsequent lowering of the flash ejector 130, the ejector pin 134 is returned by the action of the spring 138 to its initial position, with the portion 135 of enlarged diameter being brought into contact with the bottom of the recess 142. Meanwhile, after the molding flash 140 is ejected by the pin 134 from the recess 142, the trimming arm 84 associated with the movable base 52 is moved arcuately until the molding flash 140 is positioned between the fingers 86 of the arm. Then, the fingers 86 are closed to grip the molding flash 140 and the arm 84 returns to its initial position, whereupon the fingers 86 are opened to allow the molding flash 140 to fall into a molding flash chute 144.

Mechanism for Supplying Metal Rings and Removing Molded Products

In FIGS. 1 and 13, it will be noted reinforcing rings 196 are continuously supplied by a reinforcing ring conveying means 146 and a stop 150 serves to stop each ring 196 supplied by the conveyor means at a predetermined positioned. A pusher 152 for the rings 196 is mounted for reciprocal movement in a direction substantially normal to the direction of movement of the conveyor means 146 to transfer each ring 196 from the conveyor means to a base 81 of the ring supply means 80. The pusher 152 has a substantially V-shaped notch 152a at the forward end thereof. The base 81 is provided with a substantially V-shaped kicker 160 secured to the periphery thereof. As the base 81 is moved to a position over the ring-insertion member 74, the kicker 160 kicks the product from the member 74 into a product chute 158. The product positioned in the chute 158 is conveyed by a conveyor 2 to the next station.

Withdrawal of Air from the Molding Space After Mold Set is Closed

Figure 17:
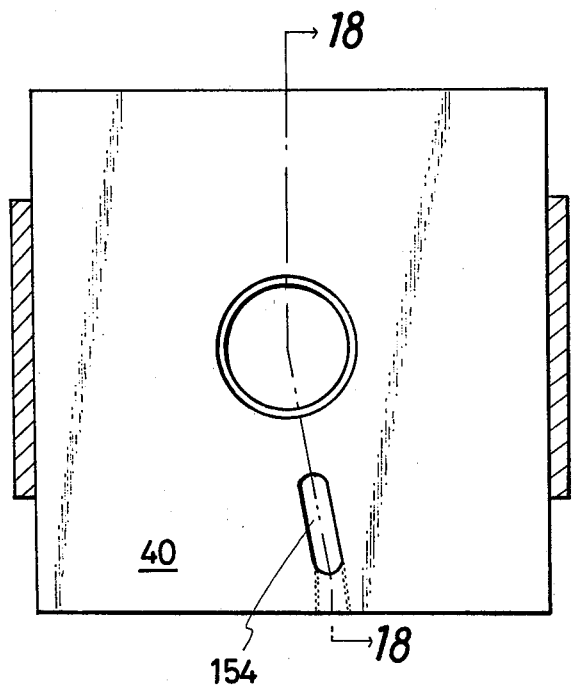
FIG. 17 is a view illustrating a heating member provided with an evacuating passage.
Figure 18:
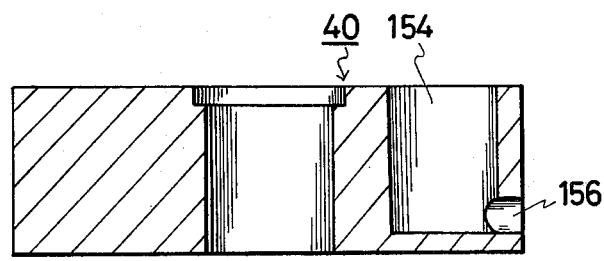
FIG. 18 is a view taken along the line 18—18 of FIG. 17, the view looking in the direction of the arrows.

As best illustrated in FIGS. 17 and 18, an evacuating passage 154 is provided on the underside of the upper heating member 40 on which the upper mold 42 is installed. The passage 154 is of oval configuration and is radially oriented with respect to the center of the heating member 40 and communicates with a suction port 156 open on one side of the heating member 40.

Two-Part Mold Embodiment

Figure 19:
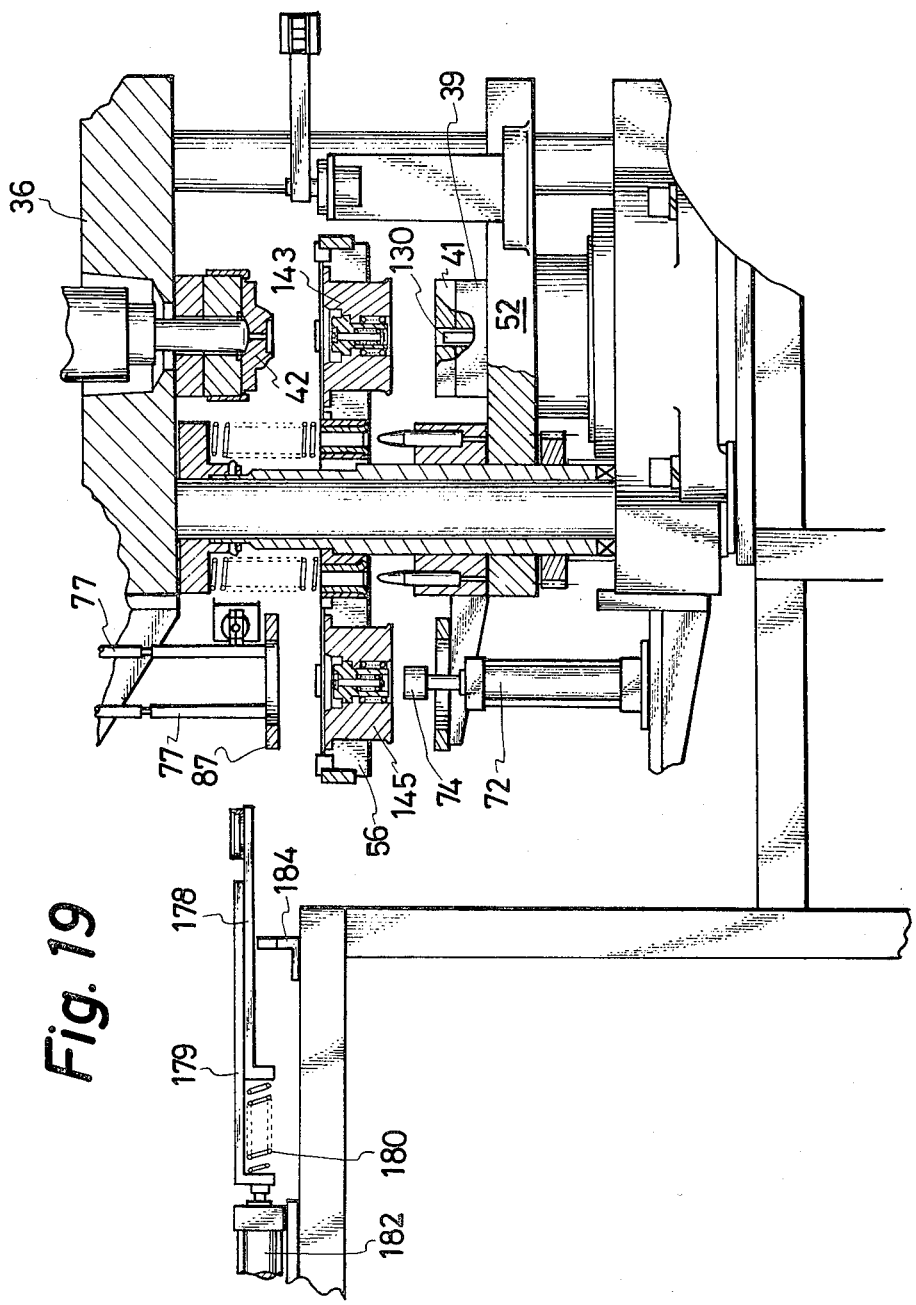
FIG. 19 is a view similar to FIG. 2 illustrating a further embodiment employing a two-part mold.
Figure 20:
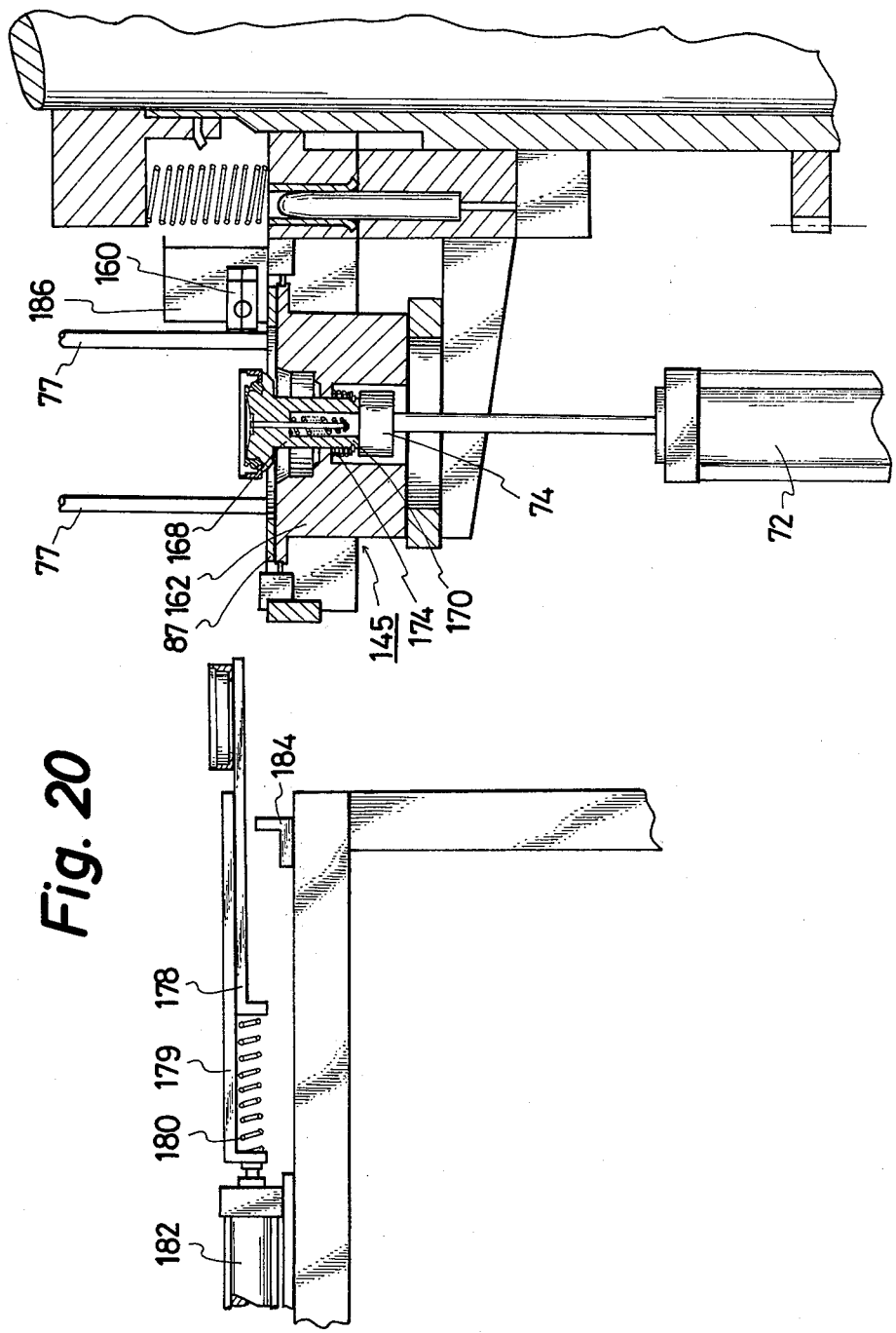
FIGS. 20–22 are views similar to FIG. 19 illustrating the relationship of the components during operation.
Figure 21:
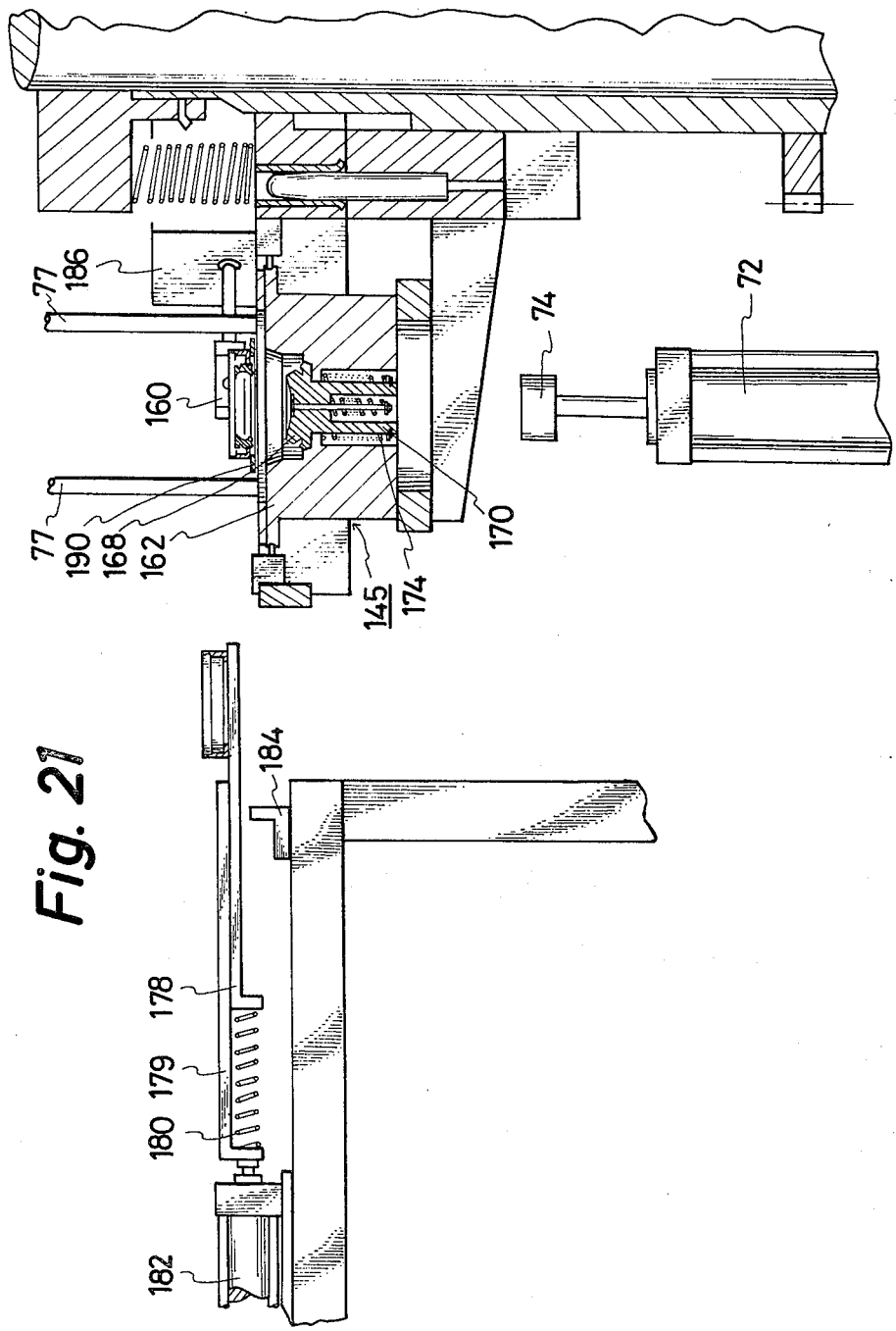

This embodiment has the same construction as the three-part mold type, except for the mold construction, means for receiving reinforcing rings, and means for removing the molded products. This embodiment is illustrated in FIGS. 19–24. In FIG. 19, it will be noted the movable base 52 carries the refractory member 39 and the lower heating member 41, with these members being secured to the top of the movable base. First and second lower mold parts 143 and 145 are supported on the mold holder 56 by a mold-retaining means similar to that previously described. Each mold part 143 and 145 is illustrated in FIG. 24. The mold part includes a substantially cylindrical lower body 162 provided at the top with a radially extending flange 162a having an annular groove 112 in the outer periphery thereof. The inner periphery of the body 162 includes a conical surface 162b tapering from its top and terminating in an annular flange 166 which extends radially inward. A lower mold core 168 having a lower hollow cylindrical extension 170 is positioned in the body 162. The extension 170 is provided in its outer periphery adjacent the lower end thereof with an annular groove 170a in which is fitted a radially outwardly extending spring retainer flange 172. A helical spring 174 is biased between the annular flange 166 and the spring retainer flange 172 for returning the core 168.

The ejector pin 134 passes through the core 168 and is provided with a portion 135 of enlarged diameter and a dish-like member 136 together with a helical spring 138 similar to the components previously described in connection with FIG. 16.

The spring 138 for the ejector pin 134 has less force than the helical spring 174 for the core 168. The outer diameter $l$ of ring retaining surface 176 of the core 168 is smaller than outer diameter L of the ring. On the preparatory cycle side (left-hand side in FIG. 19), it will be seen that cylinder 73, kicker 78, drive motor 79, and ring-supply means 80 (as illustrated in FIGS. 1 and 13) are absent and that base 148 and pusher 152 have different constructions. This is due to the fact that the mold set employed is a two-part mold.

Figure 23:
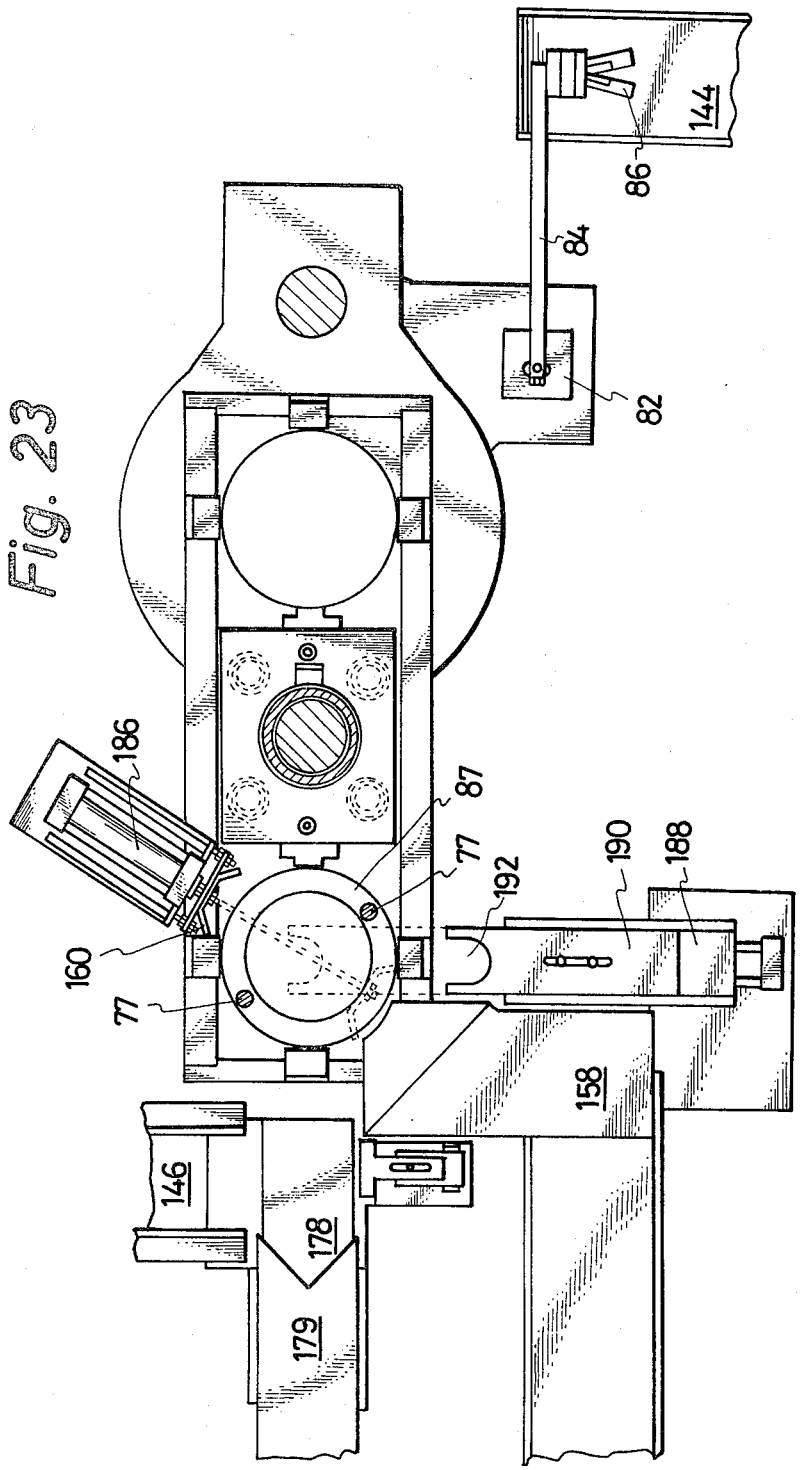
FIG. 23 is a view similar to FIG. 13 and illustrating the two-part mold depicted in FIG. 19.
Figure 24:
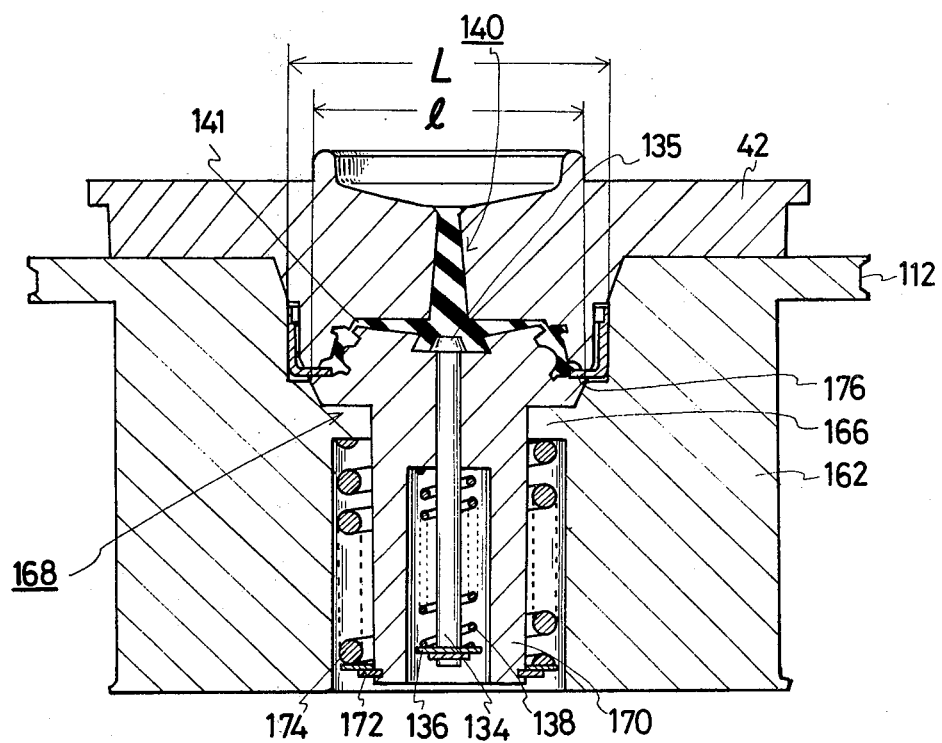
FIG. 24 is a view in cross-section illustrating a mold as shown in FIG. 19, FIGS. 25–27 illustrate different examples of the mold retaining structure

The reinforcing ring-supply means best shown in FIGS. 19 and 23, includes a receptacle base 178 for receiving each ring from the supply conveyor means 146, a slide member 179 mounted slidably on the base, a spring 180 which functions to hold the slide member 179 out of registry with respect to the base 178, a cylinder unit 182 for reciprocating the slide member 179 and base, and an abutment 184 to check the movement of the base 178 displaced a predetermined distance by the cylinder unit 182.

A product removal means is arranged to extend normal to the base 178 and includes a removal member 190 reciprocated by a cylinder unit 188. The member 190 is provided at its end facing the mold retainer 87 with a notch or cut-out 192 having a width greater than the outer diameter of ring retaining surface 176. A product kick-off cylinder unit 186 having a kicker 160 is mounted on the underside of the upper stationary base 36. Rods 77 of the cylinders 75 carrying the mold retainer 87 are positioned such that they will not impede the movement of the cylinder unit 186, the base 178, and the cylinder unit 190.

Operation

Figure 3:
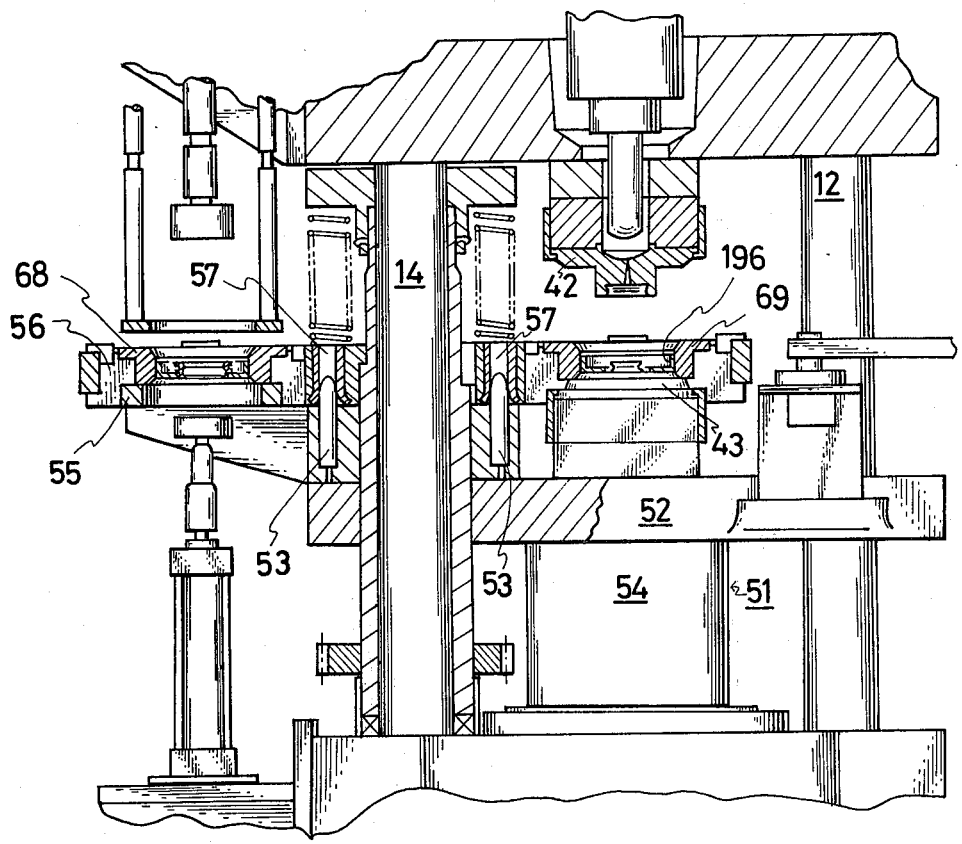
Figure 4:
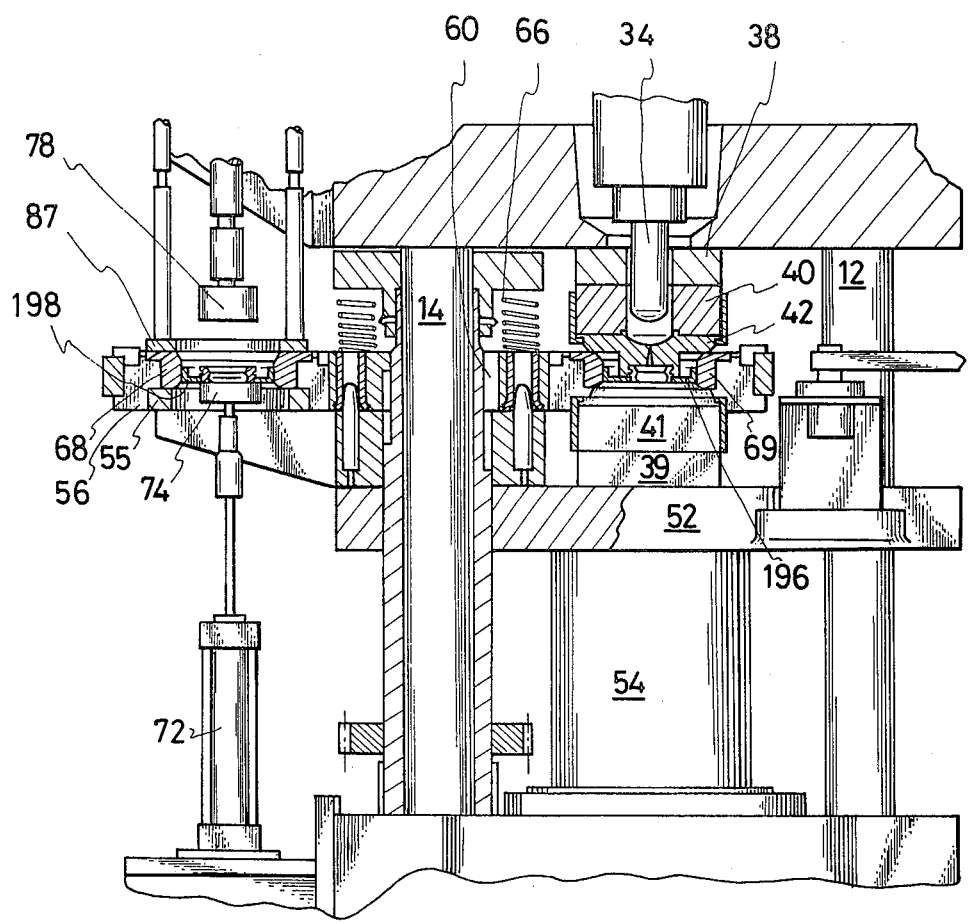
Figure 5:
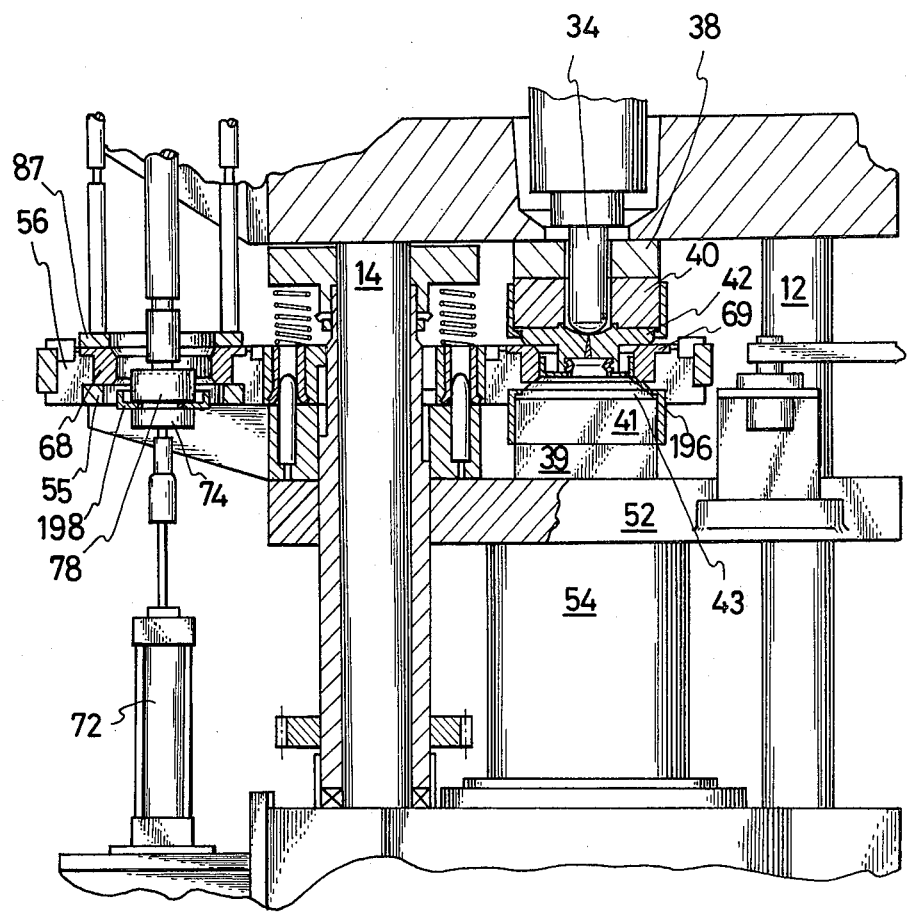

The operation will be described from the mold closing step with a reinforcing ring fitted in the intermediate mold part but the ring cannot be seen in FIG. 2. To close the mold set, the movable base 52 is elevated by piston rod 54 of the cylinder 51 and with the elevation of the base 52 to a predetermined position, the tip of the pins 53 enter the guide bushings 57 whereby the mold holder 56 is more precisely positioned relative to the base 52 by virtue of the tapering shape of the pins 53. Immediately before the movable base 52 is brought into contact with the mold holder 56, the second intermediate mold part 69 on the molding cycle side (right-hand side in FIG. 2) is contacted by the lower mold 43. At the same time, the first intermediate mold part 68 on the preparatory cycle side (left-hand side in FIG. 3) is contacted by the support base therebelow. Hence, the mold holder 56 is raised by the base 52 in excellent balance against the helical springs 66 and the mold retainer 87. When the upper mold 42 and the second intermediate mold part 68 are thus assembled, a molding pressure application step sets in (FIG. 4). In this step, the pressure in the molding space is reduced via the evacuating passage 54 in the upper heating member 40 and the injection cylinder 22 is actuated to lower a screw (not shown) extending within a cylinder (not shown) to inject rubber-like resilient material into the molding space (FIG. 5).

If an abnormal stress develops in the intermediate mold part 69 in the mold closing step due to an incorrect insertion of the reinforcing metal ring, or in the molding pressure application step due to the intrusion of foreign matter, the intermediate mold part which is flexibly retained by the diametrically opposite pins 104 (FIGS. 9 and 10) can be separated from the holder 56 as it pushes the tips 105 of the pins 104 received in the annular groove 112, thereby preventing excessive stress from being developed in the mold body. Moveover, since a slight axial displacement of each pin 104 in the groove 102 relative to each other is permitted, the compressive formation of the refractory members 38 and 39 that may result in the molding pressure application step with the intermediate mold part 69 and lower mold 43 held in contact with each other can be absorbed by the relative displacement between each retaining pin and annular groove. This prevents the transmission of excessive stress to the mold body.

Moreover, since the intermediate mold parts 68 and 69 are each retained in the mold holder in point contact with the respective pins 104, transmission of heat from the intermediate mold part being heated to the side of the mold holder can be effectively prevented. Consequently, precision and performance of the parts on the side of the machine body including the mold holder 56 can be effectively maintained.

Figure 6:
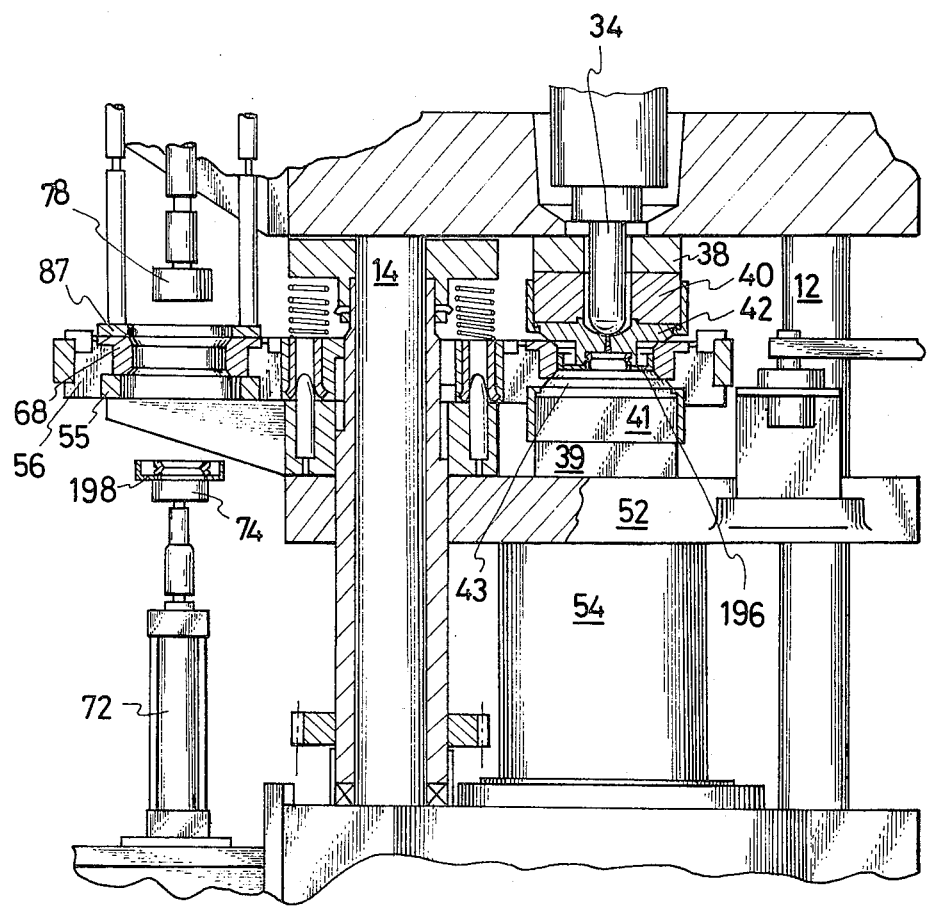

Meanwhile, during the mold closing step, the ring-insertion member 74 which also functions as a product receptacle starts to be raised by the cylinder unit 72 with respect to the intermediate mold part 68 on the preparatory cycle side with the start of raising of the piston rod 54. When the member 74 is raised to a predetermined position (FIG. 4), the kicker 78 starts to be lowered by the cylinder unit 73. After a molded product 198 retained on the intermediate mold part 68 is kicked onto the insertion member 74, the member 74 and kicker 78 are lowered and raised respectively back to their respective initial positions (FIG. 6).

Figure 7:
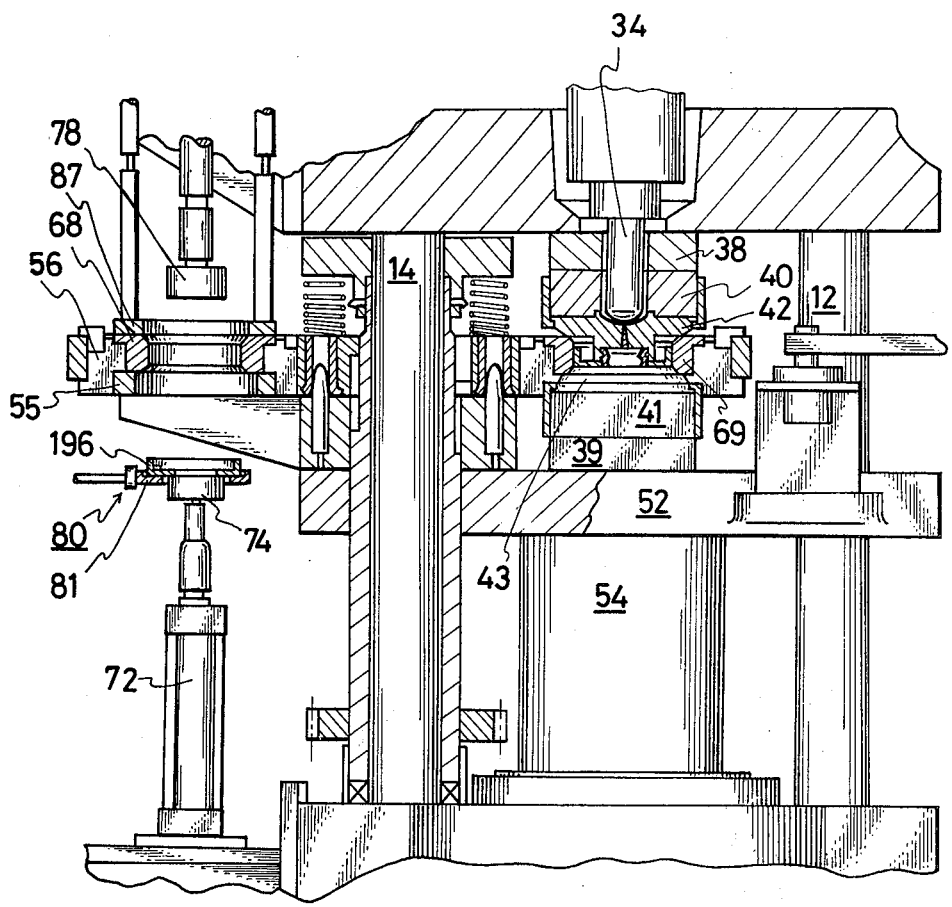
Figure 8:
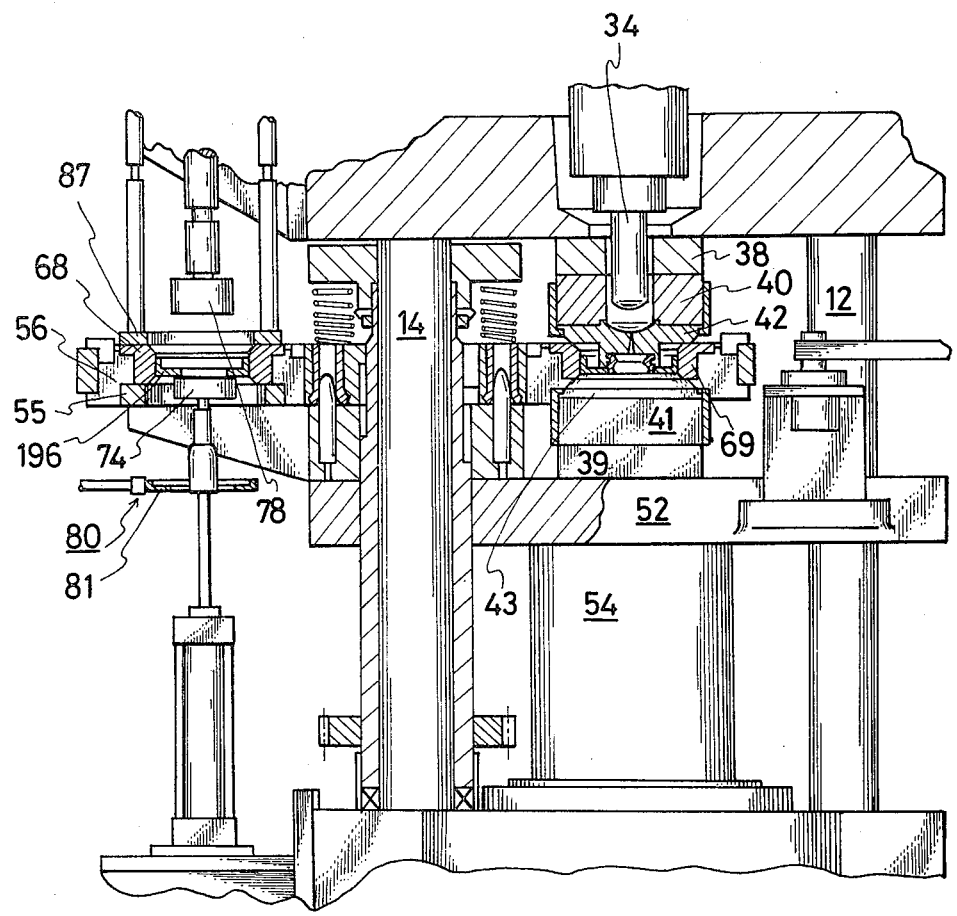

Meanwhile, the reinforcing ring-supply means 80 with the base 81 thereof retaining the reinforcing ring 196, which has been pushed onto the base with the previous advancement of the pusher 152, is moved arcuately toward the member 74 by the drive motor 79. Immediately prior to the base 81 reaching a position over the insertion member 74, the molded product 198 retained on the member 74 is kicked by the kicker 160 into the product chute 158. Then, with the subsequent raising of the insertion member 74, the ring is taken up by the insertion member 74 as such member passes through the concentric base 81 (FIG. 7) and is then inserted into the intermediate mold part 68 on the preparatory cycle side (FIG. 8). The insertion member 74 is magnetized to prevent displacement of the ring 196 while the ring is taken from the base 81 and inserted into the intermediate mold part 68.

After the starting of the raising of the mold holder 56, the first intermediate mold part 68 is held downwardly with a constant pressure by means of the annular mold retainer 87. Hence, even if the rising speed due to the insertion cylinder unit 72 being increased beyond that of the piston rod 54 for the purpose of curtailing the period of the molding cycle, the mold holder 56 including the intermediate mold part 68 will not be upwardly ejected off the movable base 52 by the insertion member 74. In addition, since the retainer 87 can provide a pressure to offset the upward pressure exerted on the intermediate mold part 68 when the ring 196 is inserted into the mold by the insertion member 74, it is possible to avoid partial loading on the mold part 68 and the mold holder 56 at the time of the insertion of the ring 196.

After the ring 196 is inserted into a predetermined position in the intermediate mold part 68, the insertion member 74 is lowered. Upon completion of the lowering of the insertion member 74, the ring-supply means 80 is moved arcuately from its position over the member 74 back to the side of the base 148 in readiness to receive the next ring 196' (FIG. 13). At this time, the pusher 152 which has already pushed a ring onto the base 148 is retracted to its initial position, whereby the next ring 196' which has been blocked against transfer to the base 148 from the conveyor means is brought onto the base in readiness for transfer onto the base 81.

When the above steps on the side of the preparatory cycle are all completed, the piston rod 54 starts to be lowered to cause a lowering of the holder 56, with the second mold part 69 remaining assembled with the lower mold 43, by the restoring action of the springs 66 until the descent is restricted by the shoulder 59 of the sleeve 46 and thereafter only the movable base 52 carrying the lower mold 43 is lowered to its predetermined initial position. In the meantime, directly prior to the completion of descent of the mold holder 56, the key 60 of the rotatable sleeve 46 is engaged in the groove 62 of the mold holder 56. Consequently, upon completion of the mold opening step, the mold holder 56 is rotated in unison with the sleeve 46 with the drive torque being transmitted from the drive motor through the gear 48 on the sleeve 46. Hence, the intermediate mold part 68 on the molding cycle side and the intermediate mold part 69 on the preparatory cycle side are interchanged.

During the mold closing step, the key 60 is not engaged in the slot 62, so that during this period, the mold holder 56 will not rotate even if a rotational torque is erroneously transmitted to the sleeve 46.

After the mold opening operation is completed, the molding flash 140 having been retained in the recess 142 in the upper mold core 132 is ejected upwardly out of the recess 142 as the pin 134 is raised by the ejector 130 as shown in FIG. 16. At the same time, trimming arm 84 is moved arcuately to a predetermined position (shown in FIG. 13 as dotted line), and then the flash is clamped between the fingers 86 of the arm 84. Thereafter, the ejector 130 is lowered to cause the ejector pin 134 to be returned to its initial position by the action of the helical spring 138. After the pin 134 is lowered, the arm 84 is returned to its initial position with the flash 140 clamped between the fingers 86. The fingers 86 are then opened, allowing the flash 140 to fall into the flash chute 144.

When the interchange of the mold part 68 and 69 and the removal of the molding flash are completed, as above-described, the mold closing operation again starts.

With the molding machine of the present invention, moldings of a variety of configurations can be manufactured. While different mold sets have to be employed for molding articles of different configurations, the replacement of the mold set can be readily achieved because of the mold mounting mechanism construction as illustrated in FIGS. 14 and 15. To install the lower mold 43 to the lower heating member, the lower mold is placed on the top of the heating member 41 between the opposite flanges 120 so that its securement flanges 126 will not overlap the flanges 120 and then it is rotated while being urged against the heating member 41 until the tip 125 of each spring 134 is received in the corresponding notch 128. In a similar manner, the upper mold can be mounted.

With respect to the operation of the two-part mold, the same is substantially that as above-described except for the trimming mechanism and mode of removing molded products and supplying the reinforcing rings.

Turning now to FIG. 19, with the mold set open and the first lower mold part 143 on the molding cycle side carrying the molded product. In this condition, the flash ejector 130 is projected upwardly from the movable base 52 to raise the ejector pin 134 within the lower mold core 168 against the action of the spring 138 whereby the molding flesh 140 is broken apart from a thin wall portion 141 and elevated to a position above the mold core 168. At this time, the raising of the mold core 168 is effected by the spring 172, the spring force of which is greater than that of the spring 138. The flash 140 is brought into the flash chute 144 by the trimming arm 84 and fingers 86, as previously described. Then, the mold holder 56 is rotated to interchange the first mold part 143 on the molding cycle side and the second mold part 145 on the preparatory cycle side. When the mold parts are interchanged, the mold closing operation is effected. In the closed condition of the mold set, the ring insertion member 74 is raised by the cylinder unit 72 to elevate extension 170 of the mold core 168 against the action of the spring 174 to bring the molded product together with the mold core 168 to a position above the body 162 (FIG.

Figure 22:
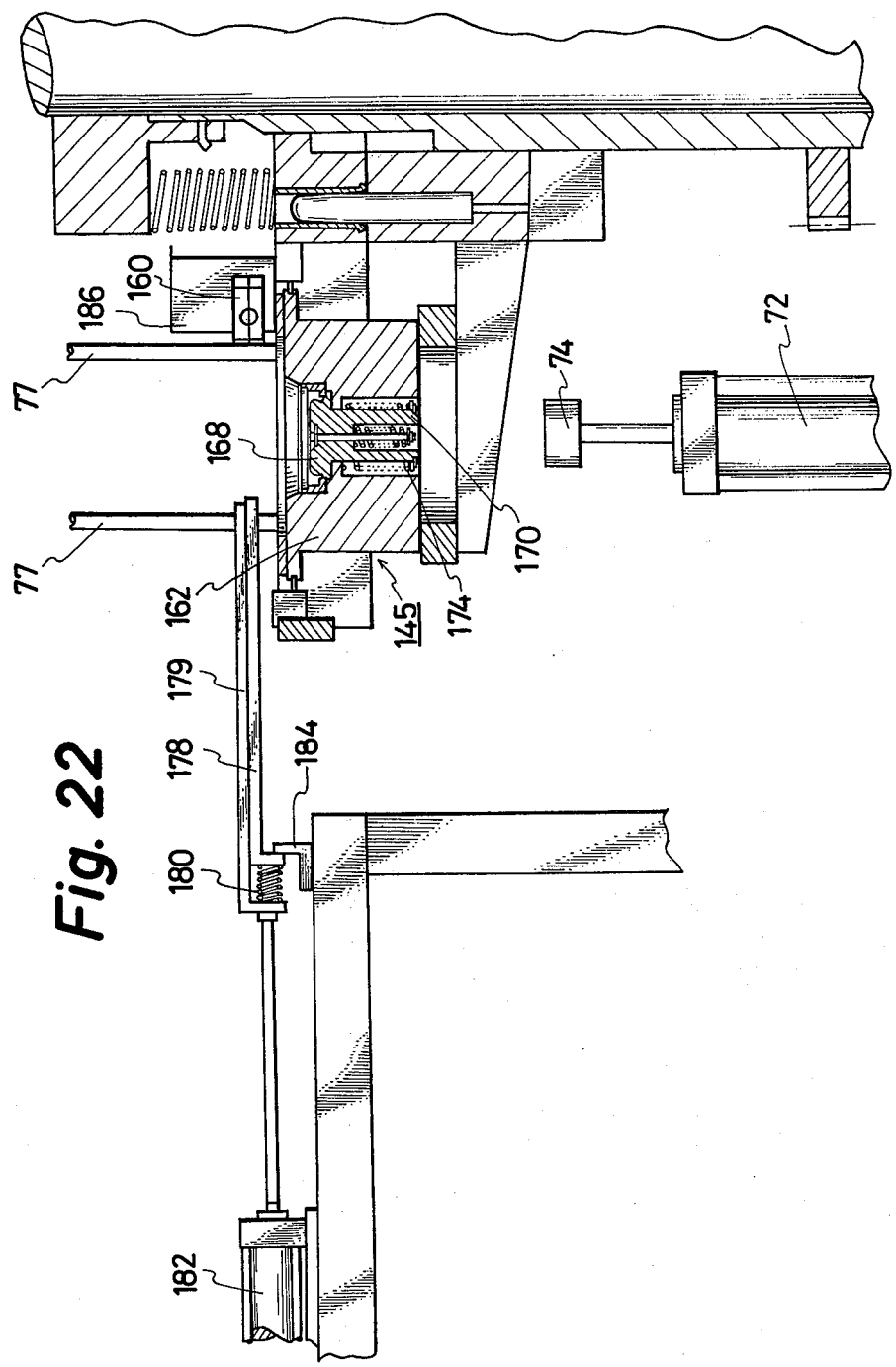

20). In this condition, the member 190 is advanced until mold core 168 is received in the notch 192 provided at its end. Then, insertion member 74 is lowered to cause core 168 to be lowered to its initial position by the restoring action of the spring 174. Consequently, the product is transferred to the member 190. In this condition, the kick-off member 160 is projected to kick the product off the member 190 (FIG. 230) into the product chute 158. Thereafter, the member 160 and member 190 are returned to their respective initial positions. The base 178 carrying a ring seated thereon and the slide member 179 are fed towards the first mold part 143. The movement of the base 178 is stopped by the abutment 184 when its top reaches a position over the mold part 143. With further movement of the slide member 179 against the action of the spring 180, the ring having been retained on the base 178 is inserted into the mold part 143 (FIG. 22). The base 178 is then returned to its initial position.

While the foregoing has been primarily concerned with embodiments using three-part mold and a two-part mold, various modifications may be adopted by persons skilled in the art.

Figure 25:
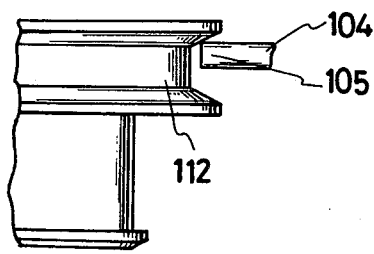
Figure 26:
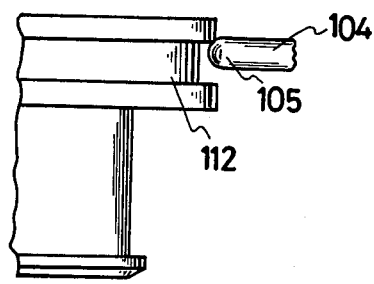
Figure 27:
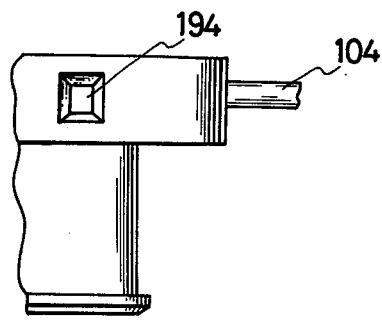

While the embodiments have made use of the ejection system, the transfer system and compression system may also be adopted to carry out the invention. In the case of the compression system, the invention can be easily executed without materially changing the constructions above-described by an arrangement that supplies reinforcing rings together with molding material. Additionally, the mold retaining mechanisms may be suitably modified. For example, it is possible to employ an annular groove 112 with a conical profile while using a retaining pin 104 having a rectangular tip 105 as illustrated in FIG. 25. Also, only the tip of the retaining pin 104 may be spherical or arc-shaped while adopting a rectangular sectional profile for the groove 112 as illustrated in FIG. 26. It is also possible to replace the annular groove with a recess 194 for receiving the tip of each retaining pin 104 and whose area is reduced towards the bottom of the recess, as illustrated in FIG. 27.

In this situation, the rotating means illustrates in FIGS. 11 and 12 may be eliminated.

In addition, while the described embodiments employ the booster-type oil pressure cylinder system as the molding pressure applying means, it may be replaced by other pressure applying means, such as a toggle mechanism.

Also, the support pillars 18, 18', 20 and 20' which have been employed so as to reduce the length of the pillars 12 and 14, may be omitted by increasing the length of the pillars 12 and 14.

Moreover, while two positioning pins 53 have been employed in the embodiments illustrated, such pins may be replaced by a single pin.

While in the embodiments shown and described, the mold parts of the mold sets are vertically arranged, it is to be understood that the same may be arranged horizontally. This can be readily effected with minor changes in design, such as, for instance, by an arrangement utilizing magnetic force for removing the molded products.

According to the present invention, precision moldings can be obtained entirely automatically and with high efficiency. Since the rotary system has been utilized, the mode of removing the molded products is substantially simplified as compared with the reciprocatory system. In the case of the reciprocatory system, the position of removing the molded product and inserting the reinforcing ring and molding material is alternated between the opposite sides thereby requiring the provision of product removal means and reinforcing ring insertion means on each side. Manifestly, this requires considerable space while the rotary system necessitates only a single set of product removal means and reinforcing ring inserting means with less equipment costs and less space.

Figure 28:
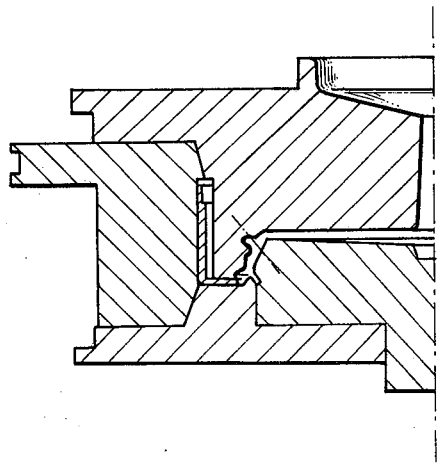
FIGS. 28–30 illustrate molds which may be used with the invention.
Figure 29:
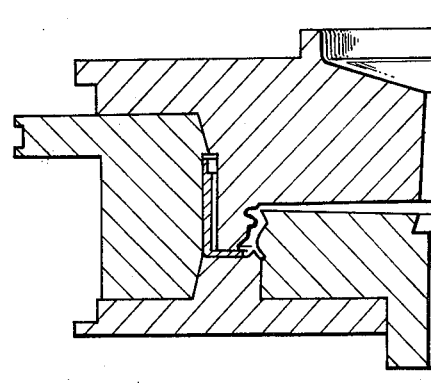
Figure 30:
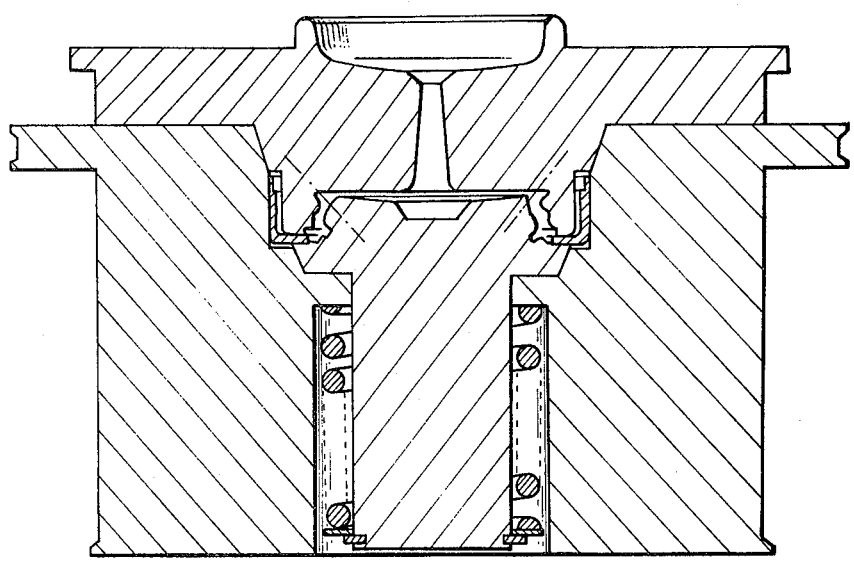

FIGS. 28–30 illustrate mold arrangements which may be used. In FIGS. 28 and 29, three components are employed, while FIG. 3 used two components. The products produced by the molds shown in FIGS. 28 and 29, after molding, require trimming at the dotted line and the ejection pin 134 in FIG. 16 or FIG. 24 is not necessary. Also, the trimming arms 84 are not employed.

On the other hand, products molded by use of the molds of FIGS. 24 and 30 require no trimming and these molds require the ejector pin 134 to break off the flash.

What we claim is:

1. A molding machine for producing products of a rubber-like resilient material, such as oil seals, including a main base, a first mold part stationarily supported in axial spaced relationship to the main base and substantially parallel to the main base, a second base between the main base and the first mold part movable axially toward and away from the first mold part, a second mold part supported by the second movable base, a holder located between and axially spaced from the first mold part and second movable base, means mounting the holder for limited axial movement and rotary movement in a plane parallel to the second movable base and first mold part, said holder carrying at least two diametrically opposite further mold parts spaced apart an equal distance from the axis of rotary movement of the holder, one of the further mold parts, during a molding cycle, being in substantial registry with the first and second mold parts, means for moving the second movable base towards and away from the holder, and means for introducing a molding material into the first mold part, the arrangement being such that movement of the second movable base towards the holder initially precisely positions the second movable base relative to the holder and the second mold part into operative relationship to the one further mold part, and continued movement of the second movable base moves the holder toward the first mold part until the first mold part and at least the one further mold part are assembled to provide a molding space therein for receiving molding material from the first mold part.

2. A molding machine for producing products of rubber-like resilient material, such as oil seals, including a main base, a plurality of spaced supports arranged in parallelism and extending normal to the main base, a stationary base mounted on the supports at a location axially spaced from and substantially parallel to the main base, a first mold part carried by the stationary base, a second base mounted on the supports between the main base and the stationary base for movement axially toward and away from the stationary base, a second mold part carried by the second base, a holder located between the stationary base and second base extending in substantial parallelism to the stationary and second bases, means mounting the holder on one of the supports for limited axial movement therealong and rotary movement thereabout in a plane parallel to the stationary and second bases, at least two diametrically opposite further mold parts mounted in the holder spaced apart an equal distance from the rotary axis of the holder, one of the further mold parts, during a molding cycle, being in substantial registry with the first and second mold parts, pressure applying means operably related to the second base for moving the second base along the supports, and means for injecting molding material into the first mold part, the arrangement being such that movement of the second base along the supports towards the holder initially precisely positions the second base relative to the holder and the second mold part into operative relationship to the one further mold part and continued movement of the second base in the same direction, moves the holder toward the stationary base until the first mold part and at least the one further mold part are assembled to provide a molding space therein for receiving molding material from the first mold part.

3. The molding machine as claimed in claim 2, in which the supports extend vertically from the main base and the first and second mold parts constitute the upper and lower mold parts, respectively.

4. The molding machine as claimed in claim 2, further including at least one pin projecting from the second base, and the holder having at least one bushing for receiving the pin for precisely positioning the second base relative to the holder.

5. The molding machine as claimed in claim 2, in which the means mounting the holder on one of the supports includes a rotatable sleeve on the one support extending through the second base and the holder, a first shoulder on the sleeve and a second shoulder on the holder to limit movement of the holder towards the second base, spring means associated with the holer urging the shoulders into engagement yet allowing the holder to move axially by movement of the second base towards the holder, the sleeve having a slot, and a key carried by the holder engageable in the slot so that when the sleeve rotates, the holder rotates in unison therewith.

6. The molding machine as claimed in claim 2, including means for inserting a reinforcing ring into the other further mold part when the one further mold part, during molding cycle, is in substantial registry with the first and second mold parts.

7. The molding machine as claimed in claim 6, in which the reinforcing ring inserting means includes a ring inserting member, the ring inserting member being concentric with the other further mold part and being reciprocable in a direction parallel to the spaced supports into and out of operative relationship to the other further mold part.

8. The molding machine as claimed in claim 7, including a power cylinder unit operably connected to the ring inserting member and supported by the main base for reciprocating the ring inserting member.

9. The molding machine as claimed in claim 7, in which the ring inserting member also serves to receive the product molded in the one further mold part when the holder is rotated to bring the other further mold part into substantial registry with the first and second mold parts.

10. The molding machine as claimed in claim 9, including a product kicker concentric with the one further mold part and being reciprocable in a direction parallel to the spaced supports and opposite the ring inserting member.

11. A molding machine for producing products of a rubber-like resilient material, such as an oil seal having a reinforcing ring, including a main base having a horizontal supporting surface, a plurality of pillars extending vertically from the supporting surface and being in spaced parallel relationship, a lower stationary base secured to lower portions of the pillars, an upper stationary base secured to upper portions of the pillars, a movable base located above the lower stationary base and being movable vertically along the pillars, an upper mold part mounted on the upper stationary base, a rotatable sleeve mounted on one of the pillars and extending between the lower and upper stationary bases, a holder having a central aperture through which the rotatable sleeve passes located between the upper stationary base and movable base, complemental means on the sleeve and holder to provide a detachable connection between the sleeve and holder, second complemental means on the sleeve and holder allowing limited movement of the holder towards the lower stationary base, the holder having rotary movement in a plane parallel to the upper stationary base and movable base upon rotation being imparted to the rotatable sleeve and the holder connected to the sleeve, two diametrically opposite further mold parts mounted in the holder spaced apart an equal distance from the axis of the sleeve, one of the further mold parts, during a molding cycle, being in substantial registry with the upper mold part, complemental means on the movable base and holder to precisely position the movable base relative to the holder when the movable base moves toward the holder, a pressure applying means between the lower stationary base and the movable base for moving the movable base vertically along the pillars, and molding material injecting means supported by the pillars above the upper stationary base in communication with the upper mold part to introduce the molding material therein, the arrangement being such that the vertical movement of the movable base along the pillars initially causes the complemental means of the movable base and holder to precisely position the movable base relative to the holder and continued movement of the movable base in the same direction moves the holder towards the upper stationary base until the upper mold part and one further mold part are assembled to provide a molding space therein for receiving molding material from the upper mold part.

12. The molding machine as claimed in claim 11, including at least one tapered pin projecting vertically from the movable base and the holder having at least one bushing for receiving the tapered pin for precisely positioning the movable base relative to the holder.

13. The molding machine as claimed in claim 11, in which the complemental means providing a detachable connection between the sleeve and holder is constituted by a key carried by the holder and a slot in the sleeve receiving the key, and the second complemental means is constituted by a first shoulder on the holder, a second shoulder on the sleeve engaged by the first shoulder and spring means associated with the holder and sleeve urging the shoulders into engagement yet allowing the holder to move axially by movement of the movable base towards the holder.

14. The molding machine as claimed in claim 11, including an annular support for further mold parts carried by the movable base and being concentric with the other of the further mold parts of the holder and being movable with the movable base in a direction parallel to the pillars.

15. The molding machine as claimed in claim 14, including a reinforcing ring insertion member mounted on the lower stationary base and being concentric with the annular support and the other further mold part and being reciprocable in a direction parallel to the pillars.

16. The molding machine as claimed in claim 11, further including a product kicker mounted on the upper stationary base and being concentric with the other further mold part and being reciprocable in a direction parallel to the pillars operative, when the holder has been rotated to move the one further mold part out of registry withe the upper mold part and the other futher mold part into registry with the upper mold part, to kick the product from the one further mold part for removal from the machine.

17. In a molding machine for producing products of rubber-like resilient material, a holder, a mold part carried by the holder and adapted to have a molded product therein, a kicker means for removing the molded product from the mold part, said kicker means being spaced axially from and concentric to one side of the mold part, means mounting the kicker means for movement towards and away from the mold part, means to move the kicker means, a product receiving means spaced axially from and concentric to the other side of the mold part, means mounting the product receiving means for movement towards and away from the other side of the mold part, and means to move the product receiving means, the arrangement being such that upon the product receiving means being moved to a predetermined position relative to the mold part, the kicker means is moved to kick the molded product from the mold part onto the product receiving means, after which the kicker means and product receiving means with the product thereon are moved away from the mold part.

18. The molding machine as claimed in claim 17, in which the means to move the kicker means and product receiving means, respectively, is constituted by a power cylinder unit.

19. The molding machine as claimed in claim 17, in which the holder carries a second mold part diametrically opposite the first mold part, means mounting the holder for rotary movement whereby the mold parts move selectively from a preparatory position to a molding position, a reinforcing ring adapted to be positioned in the mold part in the preparatory position, a reinforcing ring receiving receptacle, the receptacle being movable to a position between the mold part and the product receiving means after the molded product on the product receiving means has been removed therefrom so that movement of the product receiving means, also serving as a ring-inserting means, towards the mold part, inserts the ring in the mold part in the preparatory position thereof.

20. The molding machine as claimed in claim 18, including a supply source of reinforcing rings, a ring supply means provided for the receptacle, the ring supply means being movable from a position receiving a reinforcing ring from the supply source to the position between the mold part and the product receiving means and a product kicker member on the ring supply means, operative when the ring supply means has been moved to the position between the mold part and the product receiving means, to kick a molded product off the product means to a withdrawal station.

21. The molding machine as claimed in claim 20, including pusher means for moving a reinforcing ring from the supply source onto the ring supply means.

22. A molding machine for producing products of rubber-like resilient material, comprising a holder, at least one mold part carried by the holder and means for retaining the mold part in the holder between two diametrically opposite locations, each retaining means including a base secured to the holder, the base being provided with an open bore extending in the radial direction of the mold part, the bore having a rectangular stepped portion at its end remote from the mold part, a retaining pin having a tip end and an opposite end extending axially of the bore, the pin intermediate the ends thereof having a rectangular flange positioned in the stepped portion to limit the projection of the pin toward the mold part, spring retainer means attached to the base and maintained at a predetermined distance from the base, opposite end of the pin extending through the spring retainer member, spring means surrounding the pin biased between the flange and spring retainer means to restrict the retraction of the pin in a direction away from the mold part, and the mold part periphery having recess means therein for receiving the tip of the retaining pin, the recess means having a width allowing slight axial movement of the mold relative to the pin and the tip preventing downward movement of the mold part.

23. The mold machine as claimed in claim 22 in which said recess means is defined by an annular groove and the opposite end of the retaining pin is provided with a grip means for moving the retaining pin away from the mold part against the action of the spring means to withdraw the tip end thereof out of the groove for disconnecting the mold part including means for preventing rotation of the mold part relative to the holder, the rotation preventing means including a base member secured to the holder at a location opposite the mold part intermediate the retaining means, said base member having an open bore extending in radial direction to the mold part and provided with a shoulder, a pin having a tip portion and a shoulder engageable with the shoulder in the bore to limit the projection of the pin towards the mold part, an abutment secured to the base member cooperable with the pin to restrict pin movement away from the mold part, and the mold periphery having a notch in registry with the tip portion of the pin, the notch being deeper than the recess means and adapted to receive the tip portion, thereby preventing rotation of the mold part relative to the holder, 24. The molding machine as claimed in claim 23 further including tilting preventing means carried by the holder at a location diametrically opposite the rotation preventing means and including a planar surface in contact with the periphery of the mold part.

25. The molding machine as claimed in claim 24 in which the tilting preventing means is substantially T-shaped in cross-section, with the leg of the T constituting the planar surface.

26. The molding machine as claimed in claim 2 including a first heating member on which the first mold part is mounted, the heating member having an underside, and the underside being provided with an elongated passage leading to the outside of the heating member for evacuating air from molding space when the first mold part and the one further mold part are closed.

27. The molding machine as claimed in claim 26 in which the passage being of oval configuration and radially oriented with respect to the center of the heating member and a suction port with which the passage communicates, the suction port being open on one side of the heating member.

28. The molding machine as claimed in claim 2 including means for ejecting a molding flash from the one further mold part when the first mold part and one further mold part are opened.

29. The molding machine as claimed in claim 28 including an arm swingable between a first position remote from the mold parts to a second position adjacent the mold parts and openable and closable fingers mounted to the arm operative to close in the second position to grip the molding flash and open in the first position to allow the flash to fall in a discharge chute.

* * * * *